United States Patent
Takasu

(10) Patent No.: US 10,210,437 B2
(45) Date of Patent: Feb. 19, 2019

(54) PRINT DATA PROCESSING SYSTEM, INFORMATION PROCESSING DEVICE AND TO A PRINTING DEVICE FOR STORING PRINT DATA TO A SHARED MEMORY

(71) Applicant: Seiko Epson Corporation, Tokyo (JP)

(72) Inventor: Kazuhiro Takasu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/718,848

(22) Filed: May 21, 2015

(65) Prior Publication Data

US 2015/0339549 A1 Nov. 26, 2015

(30) Foreign Application Priority Data

May 22, 2014 (JP) .................. 2014-106297
May 22, 2014 (JP) .................. 2014-106399
Jun. 19, 2014 (JP) .................. 2014-126038

(51) Int. Cl.
*H04N 1/411* (2006.01)
*G06K 15/02* (2006.01)
*G06F 3/12* (2006.01)

(52) U.S. Cl.
CPC ......... *G06K 15/1803* (2013.01); *G06F 3/126* (2013.01); *G06F 3/1212* (2013.01); *G06F 3/1288* (2013.01)

(58) Field of Classification Search
CPC .. G06F 3/1241; G06F 3/1262; G06K 15/1803
See application file for complete search history.

(56) References Cited

U.S. PATENT DOCUMENTS

| | | | | |
|---|---|---|---|---|
| 6,359,698 B1 * | 3/2002 | Kawaguchi | ........... | G06F 3/1295 358/1.14 |
| 6,545,767 B1 * | 4/2003 | Kuroyanagi | .......... | G06F 21/608 358/1.1 |
| 8,886,556 B2 * | 11/2014 | Gnanasambandam | ..................... | G06Q 30/02 705/14.45 |
| 2006/0114508 A1 * | 6/2006 | Keeney | ................. | G06F 3/1204 358/1.15 |
| 2006/0192997 A1 * | 8/2006 | Matsumoto | ........... | G06F 3/1204 358/1.15 |
| 2008/0151292 A1 * | 6/2008 | Shirai | .................. | G06F 3/1207 358/1.15 |

(Continued)

FOREIGN PATENT DOCUMENTS

JP 2004-214731 A 7/2004
JP 2007-135047 A 5/2007

(Continued)

*Primary Examiner* — Benny Q Tieu
*Assistant Examiner* — Haris Sabah
(74) *Attorney, Agent, or Firm* — Nutter McClennen & Fish LLP; Alex Nagorniy

(57) ABSTRACT

A print data processing system 101 has a plurality of print data distribution devices, and an information processing device that receives print data from the plural print data distribution devices. The information processing device initiates a reception process unit appropriately to the plural print data distribution devices. Each reception process unit queries the related print data distribution device for print data, receives the print data when print data is on the print data distribution device, and stores the received print data to a shared storage area.

19 Claims, 23 Drawing Sheets

(56) References Cited

U.S. PATENT DOCUMENTS

| | | | |
|---|---|---|---|
| 2009/0009802 A1* | 1/2009 | Shaw | G06F 3/1203 358/1.15 |
| 2009/0016748 A1* | 1/2009 | Ferlitsch | G03G 21/02 399/39 |
| 2011/0194146 A1 | 8/2011 | Sato | |
| 2012/0026539 A1* | 2/2012 | Ohara | G06F 3/1204 358/1.15 |

FOREIGN PATENT DOCUMENTS

| JP | 2007-293444 A | 11/2007 |
|---|---|---|
| JP | 2011-165009 A | 8/2011 |
| JP | 2013-200607 A | 10/2013 |

\* cited by examiner

CONFIGURATION INTERFACE

| SERVER DIRECT PRINTING | ⦿ENABLE ○DISABLE | R1 |
|---|---|---|
| ID | 1234 | R2 |
| PASSWORD | | |
| SERVER 1 URL | https://〜 ACCESS TEST | R3 |
| SERVER 1 INTERVAL (s) | 1 | |
| SERVER 2 URL | https://〜 ACCESS TEST | R4 |
| SERVER 2 INTERVAL (s) | 1 | |
| SERVER 3 URL | https://〜 ACCESS TEST | R5 |
| SERVER 3 INTERVAL (s) | 5 | |
| SERVER AUTHENTICATION | ○ENABLE ⦿DISABLE | R6 |

[APPLY] — B1

FIG. 6

PRINT DATA PROCESSING SYSTEM, INFORMATION PROCESSING DEVICE AND TO A PRINTING DEVICE FOR STORING PRINT DATA TO A SHARED MEMORY

Priority is claimed under 35 U.S.C. § 119 to Japanese Application nos. 2014-106297 filed May 22, 2014, 2014-126038 filed Jun. 19, 2014 and 2014-106399 filed May 22, 2014 are hereby incorporated by reference in their entirety.

BACKGROUND

1. Technical Field

The present Disclosure relates to a print data processing system for processing print data, to an information processing device that can be used in the print data processing system, and to a printing device that can be used in the print data processing system.

2. Related Art

Systems in which a first device and another device are connected over a network, and the first device sends data to be transmitted over the network to the other device as the addressee based on configuration data acquired by a specific means, are known from the literature. See, for example, JP-A-2004-214731.

Systems in which a multifunction device receives content from a server connected over a network are also known from the literature. See, for example, JP-A-2007-135047. JP-A-2007-135047 discloses technology enabling high speed pull printing in this system in response to instructions from an operating panel on the multifunction device.

When plural print data distribution devices are connected to the information processing device in a print data processing system having a print data distribution device that transmits print data and an information processing device that receives print data from the print data distribution device connected through a network, there is a need to run a process appropriate to this configuration so that the information processing device can efficiently receive print data from the print data distribution device. A problem with the print data processing system according to the related art is that it is difficult for the information processing device to efficiently receive print data from the print data distribution device.

There is also a need for the information processing device to be able to receive the print data with as little time lag as possible after the print data distribution device becomes able to transmit the print data, but in the print data processing system according to the related art, there is a time lag after the print data distribution device becomes able to transmit the print data.

The following need also arises when one or more printing devices are connected to the information processing device, and the information processing device is configured to output print data received from the print data distribution device to a printing device. That is, when the information processing device sends print data received from the print data distribution device to one printing device, there is a need to send print data to the one printing device in the order the print data is received from the print data distribution device, but meeting this need is difficult.

SUMMARY

An objective of at least one embodiment of the present invention is to solve at least part of the foregoing problem as described in the following embodiments and examples.

A print data processing system according to at least one embodiment of the invention includes: a plurality of print data distribution devices; and an information processing device that receives print data from the plural print data distribution devices. The information processing device initiates a reception process unit appropriately to the plural print data distribution devices; and each reception process unit queries the related print data distribution device for the print data, receives the print data when print data is on the print data distribution device, and stores the received print data in a shared storage area.

In this example, the information processing device initiates a plurality of reception process units appropriately to the plural print data distribution devices. Each reception process unit queries the related print data distribution device for print data, receives the print data when print data is on the print data distribution device, and stores the received print data in a shared storage area. As a result, the reception process units can independently receive print data from the related print data distribution device, and can efficiently receive print data in a configuration having plural connected print data distribution devices, without being affected by processes on the other reception process units and without affecting processes on the other reception process units.

In a print data processing system according to another aspect of at least one embodiment of the invention, when storing the print data received from the print data distribution device in the storage area, the reception process unit of the information processing device prohibits storing print data in the storage area by another reception process unit.

This configuration prevents print data received by a reception process unit corresponding to one print data distribution device and print data received by another reception process unit corresponding to another print data distribution device from being mixed and stored together in the shared storage area, and can store the print data in the storage area in the order received.

In a print data processing system according to another aspect of at least one embodiment of the invention, the reception process unit of the information processing device queries for print data at a specific time interval, and can set the specific time individually for each reception process unit.

Thus comprised, the interval for querying the print data distribution device can be set appropriately to the system specifications and needs, such as shortening the interval for querying a print data distribution device that distributes print data having a high priority level and requiring prompt processing.

In a print data processing system according to another aspect of at least one embodiment of the invention, the information processing device is connected to an external device, and distributes print data that is stored in the storage area and contains the identification information of the external device to the external device.

Thus comprised, the information processing device can send print data received from the print data distribution device to the appropriate external device.

In a print data processing system according to another aspect of at least one embodiment of the invention, the information processing device has a print unit that prints based on the print data, and prints by the print unit based on print data that is stored in the storage area and contains the identification information of the information processing device.

Thus comprised, the information processing device can print based on print data received from the print data distribution device.

Another aspect of at least one embodiment of the invention is an information processing device characterized by querying an external device for print data, receiving the print data when print data is stored on the external device, and initiating for each connected external device a reception process unit that stores the received print data in a shared storage area.

Thus comprised, when a print data processing system is built with multiple print data distribution devices connected as external devices to the information processing device, the information processing device efficiently receives print data in a configuration having plural print data distribution devices connected.

Another aspect of at least one embodiment of the invention is a printing device including: a print unit that prints based on print data; the printing device querying an external device for the print data, receiving the print data when print data is stored on the external device, and initiating for each connected external device a reception process unit that stores the received print data in a shared storage area.

Thus comprised, when a print data processing system is built with multiple print data distribution devices connected as external devices to a printing device as the information processing device, the printing device efficiently receives print data in a configuration having plural print data distribution devices connected.

A print data processing system according to another aspect of at least one embodiment of the invention also has a printing device connected to the information processing device. The information processing device includes a management unit that, based on identification information contained in the print data stored in the storage area, initiates an output process unit corresponding to the identification information. The output process unit reads the print data stored in the storage area in the order received, and outputs the print data including the identification information related to the output process unit to the printing device.

Based on identification information contained in the print data stored in the storage area, the information processing device in this aspect of the invention initiates an output process unit corresponding to the identification information. The output process unit reads the print data containing the related identification information from the print data stored in the storage area in the order received, and outputs to the printing device identified by the identification information. As a result, the output process unit sends the print data in the order received to the appropriate printing device, and the information processing device can send the print data received from the print data distribution device to the printing device in the order received from the print data distribution device.

In a print data processing system according to another aspect of at least one embodiment of the invention, the management unit of the information processing device initiates a new output process unit when the output process unit corresponding to the identification information contained in the print data does not exist, and when the output process unit exists, not initiating a new output process unit.

Thus comprised, initiating multiple output process units for the same printing device can be prevented.

In a print data processing system according to another aspect of at least one embodiment of the invention, the output process unit of the information processing device stops when there is no print data in the storage area that contains the identification information of the output process unit and is unread.

Thus comprised, when one output process unit finishes reading print data from the storage area and further processing by that one output process unit is no longer required, that output process unit remaining initiated can be suppressed.

In a print data processing system according to another aspect of at least one embodiment of the invention, identification information of the printing device or identification information of the information processing device is included in the print data; the information processing device includes a print unit and a print control unit that controls the print unit based on the print data; the management unit of the information processing device initiates the output process unit corresponding to the identification information of the information processing device when print data containing the identification information of the information processing device is stored by the reception process unit in the storage area; and the output process unit corresponding to the identification information of the information processing device reads the print data stored in the storage area in the order received, and outputs the print data including the identification information of the information processing device to the print control unit.

Thus comprised, the information processing device can process print data to be processed by the information processing device and print in the order the print data was received.

In an information processing device according to another aspect of at least one embodiment of the invention, the information processing device has a management unit that initiates an output process unit corresponding to identification information based on identification information of an external device included in the print data stored in the storage area; and the output process unit reads the print data stored in the storage area in the order received, and outputs the print data including the identification information of the output process unit to the external device.

Thus comprised, when a print processing system is built with multiple printing devices connected as external devices to an information processing device, the information processing device can send print data to the printing device in the order received.

A printing device according to another aspect of at least one embodiment of the invention preferably also has: a print control unit that controls the print unit based on print data; and a management unit that initiates an output process unit related to identification information based on the identification information of an external device or the identification information of the printing device included in the print data stored in the storage area. The output process unit related to the identification information of the external device reads the print data stored in the storage area in the order received, and outputs the print data including the identification information related to the output process unit related to the identification information of the external device to the external device. The output process unit related to the identification information of the printing device reads the print data stored in the storage area in the order received, and outputs the print data including the identification information related to the output process unit related to the identification information of the printing device to the print control unit.

Thus comprised, when a print processing system is built with multiple printing devices connected as external devices to a printing device as the information processing device, the information processing device can send print data to be processed by a particular printing device to the printing device in the order the print data was received, and can print and process print data that should be processed by the information processing device in the order received.

A print data processing system according to another aspect of at least one embodiment of the invention preferably also includes a printing device connected to the information processing device. The information processing device includes a management unit that, based on identification information contained in the print data stored in the storage area, initiates an output process unit corresponding to the identification information. The management unit reads the print data stored in the storage area in the order received, and outputs the read print data to the output process unit related to the identification information contained in the read print data. The output process unit outputs the print data input from the management unit to the printing device of the corresponding identification information.

Thus comprised, the management unit of the information processing device initiates an output process unit corresponding to the identification information based on identification information contained in the print data stored in the storage area, and the management unit reads the print data stored in the storage area in the order received, and outputs the read print data to the output process unit related to the identification information contained in the read print data. The output process unit outputs the print data input from the management unit to the printing device of the corresponding identification information. Thus comprised, the output process unit sends print data in the order received to the appropriate printing device, and when sending print data received from the print data distribution device to the printing device, the information processing device can send the print data in the order received from the print data distribution device.

In a print data processing system according to another aspect of at least one embodiment of the invention, the management unit of the information processing device does not output the next print data to the output process unit related to the identification information during the period from outputting the print data to the output process unit related to particular identification information until the process of the printing device based on the output print data is completed.

Thus comprised, the management unit can send the next print data to the output process unit after printing based on when the print data is completed.

In an information processing device according to another aspect of at least one embodiment of the invention, the information processing device includes a management unit that, based on identification information of an external device contained in the print data stored in the storage area, initiates an output process unit corresponding to the identification information; the management unit reads the print data stored in the storage area in the order received, and outputs the print data to the output process unit related to the identification information contained in the read print data; and the output process unit outputs the print data input from the management unit to the external device of the corresponding identification information.

Thus comprised, when a print processing system is built with multiple printing devices connected as external devices to an information processing device, the information processing device can send print data to the printing device in the order received.

A printing device according to another aspect of at least one embodiment of the invention preferably also has: a print control unit that controls the print unit based on print data; and a management unit that initiates an output process unit related to identification information based on the identification information of an external device or the identification information of the printing device included in the print data stored in the storage area; the management unit reading the print data stored in the storage area in the order received, and outputting the print data to the output process unit related to the identification information contained in the read print data; the output process unit related to the identification information of the external device outputting the print data input from the management unit to the external device of the related identification information; and the output process unit related to the identification information of the printing device outputting the print data input from the management unit to the print control unit.

Thus comprised, when a print processing system is built with multiple printing devices connected as external devices to a printing device as the information processing device, the information processing device can send print data to be processed by a particular printing device to the printing device in the order the print data was received, and can print and process print data that should be processed by the information processing device in the order received.

In a print data processing system according to another aspect of at least one embodiment of the invention, the reception process unit of the information processing device executes a first process of querying the print data distribution device for print data at a specific interval regardless of whether or not printing based on the received print data is completed, and if the response to the query indicates there is print data, requesting transmission of the print data from the print data distribution device and receiving the print data.

Thus comprised, the information processing device queries the print data distribution device for print data regardless of whether or not printing based on the received print data is completed, and receives the print data if there is any. As a result, the information processing device can ask for print data regardless of the status of a process based on the print data, and can shorten the time until the information processing device receives print data after the print data distribution device.

In a print data processing system according to another aspect of at least one embodiment of the invention, when printing based on the received print data is completed, the reception process unit of the information processing device sends a printing completion report reporting that printing ended to the print data distribution device.

The print data distribution device stores the information indicating that printing ended relationally to the related print data when the printing completion report is received. When a print data query is received from the information processing device and there is print data not related to information indicating that printing completed, the print data distribution device returns a reply indicating that there is print data to process.

When a response indicating that there is print data to process is received from the print data distribution device, the reception process unit of the information processing device requests transmission of the print data from the print data distribution device, receives the print data, compares the newly received print data with previously received print data, and if the data matches, discards the newly received print data.

Thus comprised, the print data distribution device sends print data for which a printing completion report has not been received to the information processing device when queried for print data. As a result, the print data distribution device may send the same print data more than once. When print data is received and the newly received print data matches previously received print data, the information processing device discards the newly received print data. Therefore, when the same print data is received more than once, processing the print data again can be prevented.

Further preferably in the print data processing system according to this example, the reception process unit of the information processing device changes the interval between print queries based on how frequently print data is discarded.

Thus comprised, the interval between print data queries can be shortened proportionally to the time required to print the print data, and when print data is frequently discarded, this interval can be appropriately adjusted accordingly.

In another example of the print data processing system, the reception process unit of the information processing device stores the received print data in a specific storage area, and adjusts the interval between print data queries according to the status of the storage area.

Thus comprised, the time for querying for print data can be adjusted according to the status of the storage area, such as the storage capacity available in the storage area, and memory overflows can be suppressed.

In another example of the print data processing system, the reception process unit of the information processing device can also execute a second process that does not query for print data until printing based on the received data is completed after the print data is received, and queries for print data after printing is completed, and can switch between the first process and the second process.

Thus comprised, the first process or second process can be selected according to the specifications of the print data processing system.

A print data processing system according to another aspect of at least one embodiment of the invention also has a printing device that communicates with the information processing device. The information processing device has an output unit that sends the received print data to the printing device. The reception process unit of the information processing device queries the print data distribution device for print data with an interval between queries regardless of whether or not the printing device has finished printing based on the received print data.

Thus comprised, the information processing device can query the print data distribution device for print data regardless of the status of processing by the connected printing device, and can shorten the time until the information processing device receives print data after the print data distribution device becomes able to send the print data.

In another example of the print data processing system, the information processing device has a print unit that prints based on the print data. The reception process unit of the information processing device queries the print data distribution device for print data at a specific interval regardless of whether or not printing by the print unit based on the received print data is completed.

Because the information processing device in this aspect of the invention queries the print data distribution device for print data regardless of the status of processing by the print unit, the time until the information processing device receives the print data after the print data distribution device becomes able to transmit the print data can be shortened.

In an information processing device according to another aspect of at least one embodiment of the invention, the information processing device queries the external device for print data at a specific interval regardless of whether or not printing based on print data received from the external device is completed, and if the response to the query indicates there is print data, requesting transmission of the print data from the external device and receiving the print data.

Thus comprised, when the information processing device is connected to an external device corresponding to the print data distribution device, the information processing device queries the external device for print data regardless of whether or not printing based on the received print data is completed, and when there is print data, receives the print data. The information processing device can therefore query for print data regardless of the status of processing based on the print data, and can shorten the time until the information processing device receives the print data after the external device becomes able to transmit the print data.

A printing device according to another aspect of at least one embodiment of the invention also has a reception process unit that queries the external device for print data at a specific interval regardless of whether or not printing by the print unit based on print data received from the external device is completed, and if the response to the query indicates there is print data, requests transmission of the print data from the external device and receives the print data.

Thus comprised, when a printing device corresponding to an information processing device is connected to an external device corresponding to a print data distribution device, the printing device queries the external device for print data regardless of whether or not printing based on the received print data is completed, and when there is print data, receives the print data. The printing device can therefore query for print data regardless of the status of processing based on the print data, and can shorten the time until the printing device receives the print data after the external device becomes able to transmit the print data.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 shows an example of a user interface.

DESCRIPTION OF EMBODIMENTS

Preferred embodiments of the present invention are described below with reference to the accompanying figures.

Figure 1:
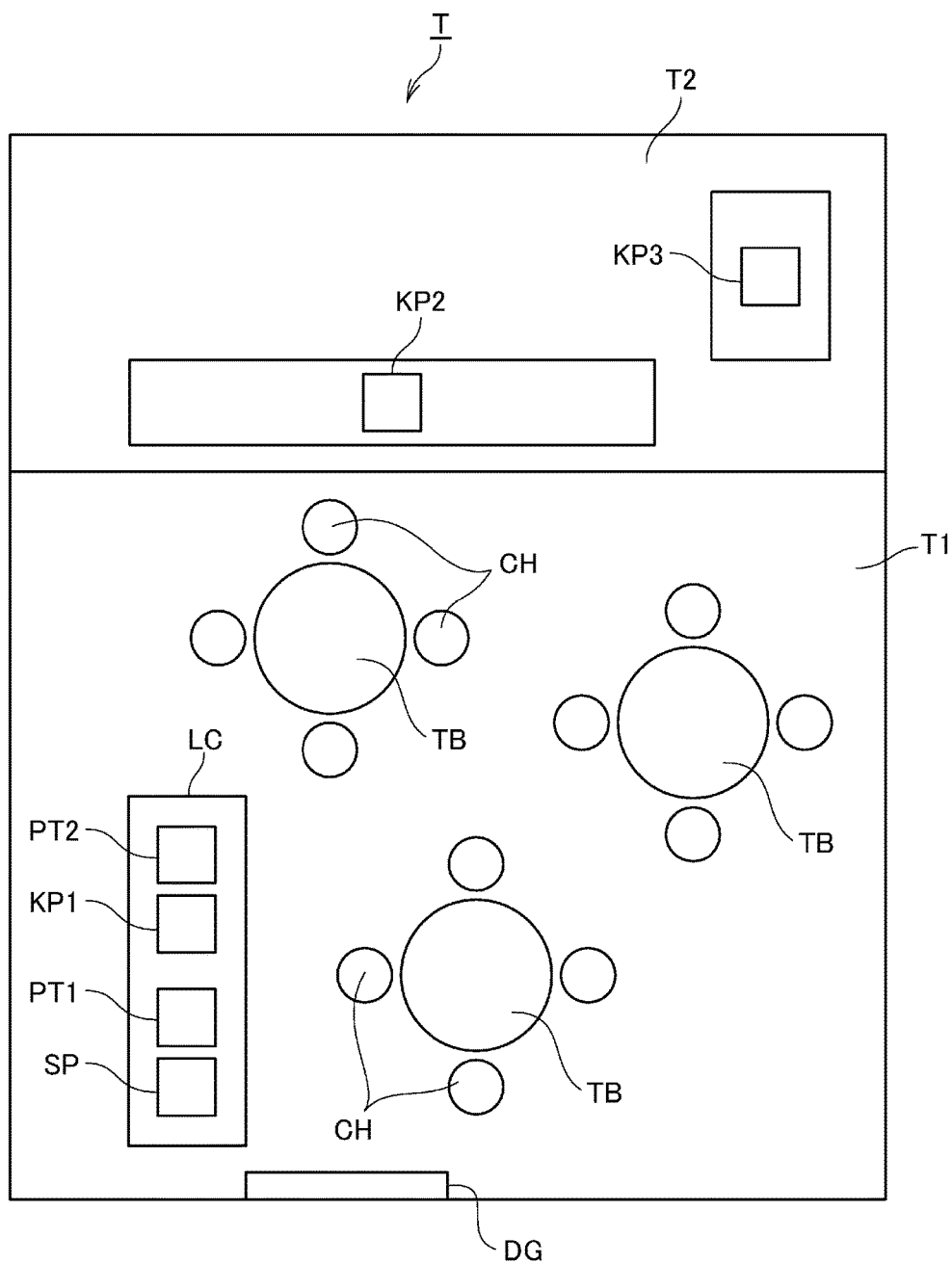
FIG. 1 illustrates the configuration of a print data processing system according to at least one embodiment of the invention.

FIG. 1 illustrates an example of the configuration of part of a print data processing system 1 according to a first embodiment.

FIG. 1 illustrates an example of the print data processing system 1 (shown in FIG. 2, FIG. 3) deployed in a restaurant T that serves food and drinks to customers of the restaurant T.

The restaurant T shown in FIG. 1 is divided into a dining room T1 and a kitchen T2.

The dining room T1 is where customers of the restaurant T sit and where the wait staff (referred to below as waiters) in the dining room T1 serve food and drinks to the customers. Multiple tables TB where food and drinks can be placed are arranged in the dining room T1, and multiple chairs CH are provided for customers at each table TB.

A tablet terminal 10 (see FIG. 2, FIG. 3) used to take customer orders is provided to each waiter. When taking an order from a customer in the dining room T1, the waiter goes to the customer to receive the customer's order and input the order to the tablet terminal 10. The configuration and processes of the tablet terminal 10 are described below.

A checkout counter LC where customers pay for their service is located near the exit DG. A control printer SP (information processing device, printing device), which is a printer capable of printing receipts, and a first printer KP1 (printing device), which is another printer capable of printing receipts, are installed at the checkout counter LC. A first POS terminal PT1 and a second POS terminal PT2 corresponding respectively to the control printer SP and the first printer KP1 are also installed at the checkout counter LC.

A waiter inputs data regarding the customer transaction to the first POS terminal PT1 or the second POS terminal PT2 at the checkout counter LC.

A receipt with information related to the transaction is then produced by the control printer SP or the first printer KP1 in response to input corresponding to the transaction by the waiter. The waiter than gives the receipt produced by the control printer SP or first printer KP1 to the customer. The configuration and processes of the control printer SP, first printer KP1, first POS terminal PT1, and second POS terminal PT2 are described below.

The kitchen T2 is where the kitchen T2 staff (referred to below as cooks) prepare the food and drinks, and is where drink machines, stoves, refrigerators and other equipment are installed. A second printer KP2 (printing device) and a third printer KP3 (printing device) are also installed in the kitchen T2. When a waiter inputs an order to the tablet terminal 10 according to an order received from a customer, an order ticket is printed with information related to the ordered food and drinks from the second printer KP2 or the third printer KP3. The information related to the food and drinks is information indicating the type of food and drinks ordered and the quantity of each order. Referring to the order ticket printed by the second printer KP2 or third printer KP3, the cooks then prepare the food and drinks ordered by the customer. The configuration and processes of the second printer KP2 and third printer KP3 are described below.

Figure 2:
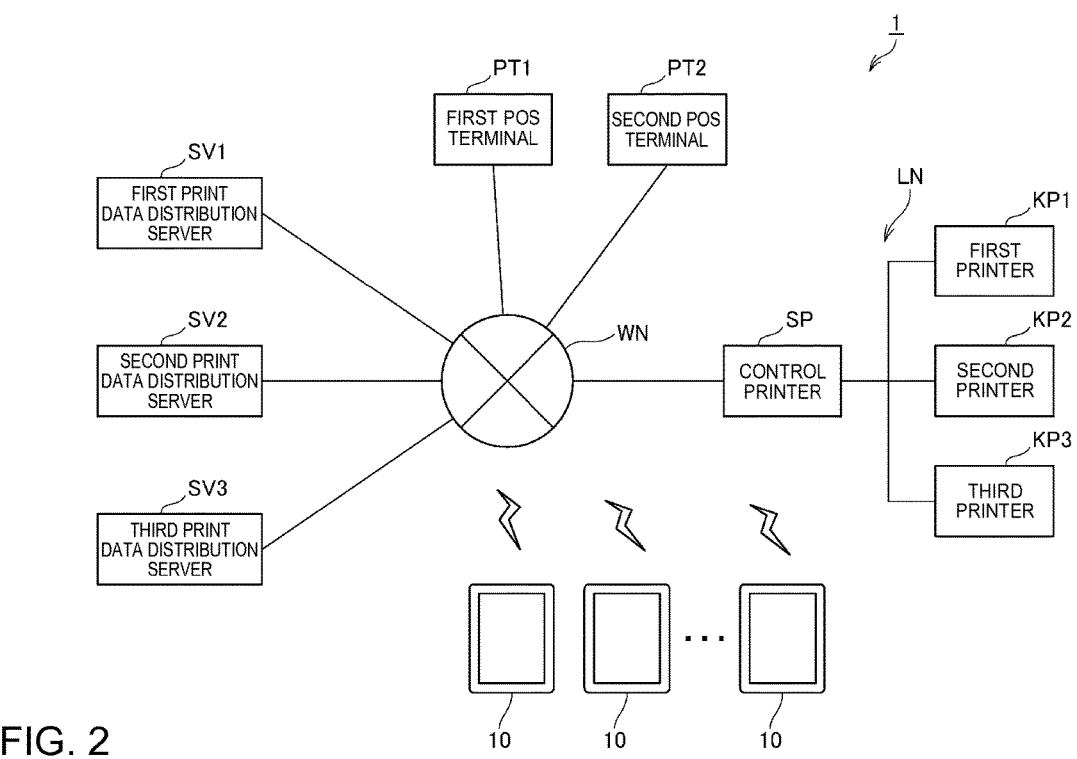
FIG. 2 illustrates the network of the print data processing system.

FIG. 2 is a network diagram of the print data processing system 1 according to this embodiment.

As shown in FIG. 2, the control printer SP of the print data processing system 1 connects to a wide-area network WN such as the Internet or a telecommunications network.

Each tablet terminal 10 assigned to the waiters also connects to the wide-area network WN.

The print data processing system 1 includes a first print data distribution server SV1 (print data distribution device), a second print data distribution server SV2 (print data distribution device), and a third print data distribution server SV3 (print data distribution device). Note that print data distribution server SV is used below when not differentiating between the first print data distribution server SV1, second print data distribution server SV2, and third print data distribution server SV3. Multiple print data distribution servers SV connect to the wide-area network WN.

The control printer SP, tablet terminals 10, and print data distribution servers SV are connected to each other through the wide-area network WN.

As shown in FIG. 2, the control printer SP connects to an Ethernet (R) based local area network LN. Connected to the local area network LN are the first printer KP1, second printer KP2, and third printer KP3. The control printer SP can communicate with the first printer KP1, second printer KP2, and third printer KP3 through the local area network LN.

Figure 3:
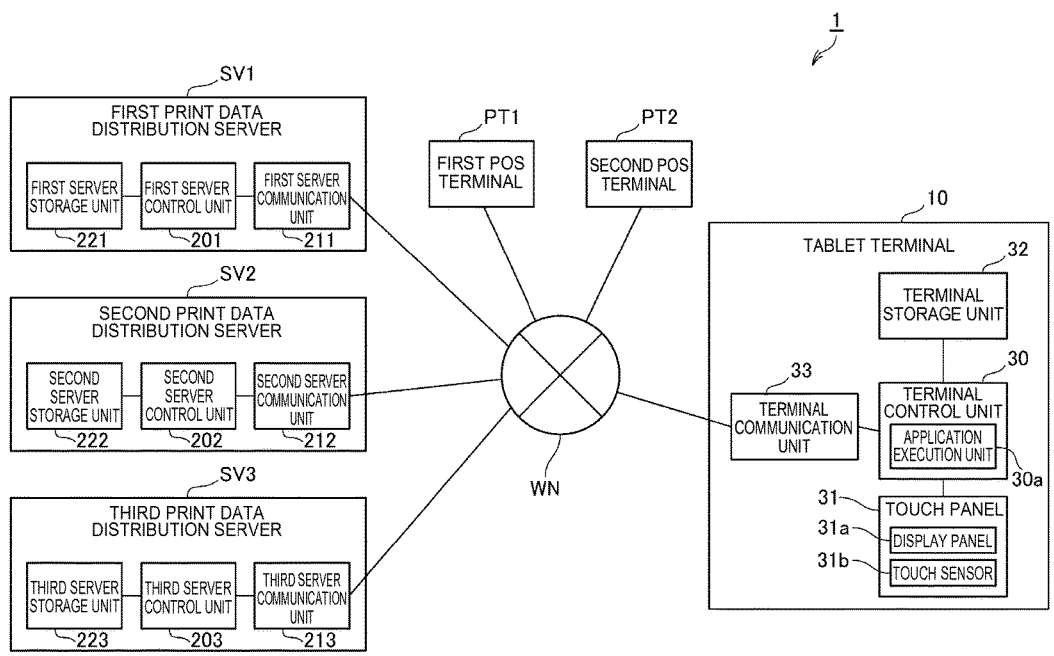
FIG. 3 is a function block diagram of devices in the print data processing system.

FIG. 3 is a block diagram illustrating the functional configuration of the first print data distribution server SV1, second print data distribution server SV2, third print data distribution server SV3, tablet terminal 10, first POS terminal PT1, and second POS terminal PT2.

As shown in FIG. 3, the first print data distribution server SV1 includes a first server control unit 201, a first server communication unit 211, and a first server storage unit 221.

The first server control unit 201 includes a CPU, ROM, RAM, and other peripheral circuits, and controls the first print data distribution server SV1.

The first server communication unit 211 communicates with other devices connected to the wide-area network WN according to a specific communication protocol as controlled by the first server control unit 201.

The first server storage unit 221 includes nonvolatile memory, and stores data.

The configuration of the second print data distribution server SV2 and the third print data distribution server SV3 is identical to the configuration of the first print data distribution server SV1. The second print data distribution server SV2 has a second server control unit 202, second server communication unit 212, and second server storage unit 222. The third print data distribution server SV3 has a third server control unit 203, third server communication unit 213, and third server storage unit 223.

In this embodiment, the first print data distribution server SV1, second print data distribution server SV2, and third print data distribution server SV3 are independent servers. However, the invention is not limited to this configuration, and configurations in which server software appropriate to a print data distribution server SV is installed on a single server device, and the single server device functions as a first print data distribution server SV1, second print data distribution server SV2, and third print data distribution server SV3 are within the scope of the present invention.

The tablet terminal 10 can be a tablet-type mobile computing device having a touch panel 31 on the front.

As shown in FIG. 3, the tablet terminal 10 includes a terminal control unit 30, touch panel 31, terminal storage unit 32, and terminal communication unit 33.

The terminal control unit 30 includes a CPU, ROM, RAM, and other peripheral circuits, and controls the tablet terminal 10. One function block of the terminal control unit 30 is an application execution unit 30a. The function of the application execution unit 30a is described further below.

The touch panel 31 includes a display panel 31a and touch sensor 31b. The display panel 31a is a liquid crystal display panel or OLED display panel, for example, and displays images as controlled by the terminal control unit 30. The touch sensor 31b is disposed over the display panel 31a, detects touches by the user (by a waiter in this example), and outputs to the terminal control unit 30.

The terminal storage unit 32 is nonvolatile memory and stores data.

The terminal communication unit 33 communicates with other devices connected to the wide-area network WN according to a specific communication protocol as controlled by the terminal control unit 30.

The first POS terminal PT1 and second POS terminal PT2 are computers with the functions described below. The first POS terminal PT1 and second POS terminal PT2 communicate with other devices connected to the wide-area network WN. The first POS terminal PT1 and second POS terminal PT2 also receive transaction-related input, and generate information related to the transaction based on the input.

Figure 4:
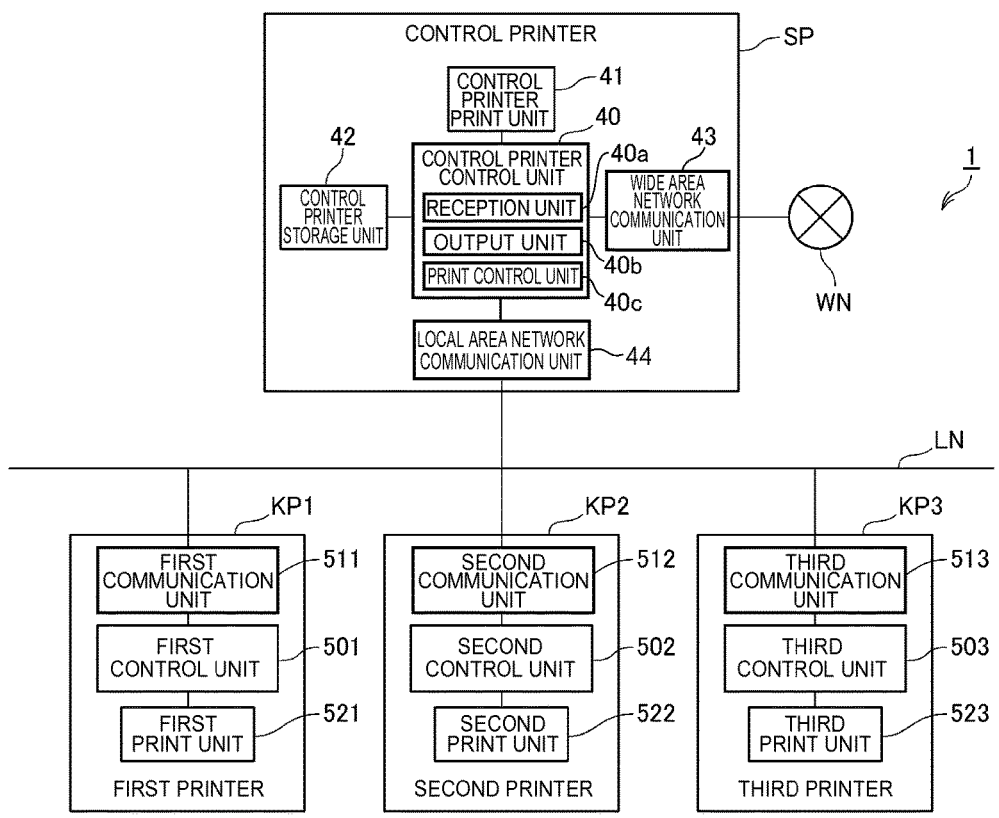
FIG. 4 is a function block diagram of devices in the print data processing system.

FIG. 4 is a block diagram showing the functional configuration of the control printer SP, first printer KP1, second printer KP2, and third printer KP3.

The control printer SP, first printer KP1, second printer KP2, and third printer KP3 are thermal printers but are not limited as such and can be.

As shown in FIG. 4, the control printer SP has a control printer control unit 40, control printer print unit 41 (print unit), control printer storage unit 42, wide-area network communication unit 43, and local-area network communication unit 44.

The control printer control unit 40 includes a CPU, ROM, RAM, and other peripheral circuits, and controls the control printer SP. Function blocks of the control printer control unit 40 include a reception unit 40a, output unit 40b, and print control unit 40c. The function blocks are described further below.

The control printer print unit 41 has a storage compartment for storing thermal roll paper, a conveyance unit that conveys the thermal roll paper stored in the storage compartment, a thermal head for forming dots on the thermal roll paper conveyed by the conveyance unit, and a cutting unit that cuts the thermal roll paper.

The control printer storage unit 42 has nonvolatile memory and stores data.

The wide area network communication unit 43 communicates with other devices connected to the wide-area network WN according to a specific communication protocol as controlled by the control printer control unit 40.

The local area network communication unit 44 communicates with the first printer KP1, second printer KP2, and third printer KP3 connected to the local area network LN according to a specific communication protocol as controlled by the control printer control unit 40.

The first printer KP1 includes a first control unit 501, first communication unit 511, and first print unit 521.

The first control unit 501 includes a CPU, ROM, RAM, and other peripheral circuits, and controls the first printer KP1.

The first communication unit 511 communicates with the control printer SP connected to the local area network LN according to a specific communication protocol as controlled by the first control unit 501.

The first print unit 521 has a storage compartment for storing thermal roll paper, a conveyance unit that conveys the thermal roll paper stored in the storage compartment, a thermal head for forming dots on the thermal roll paper conveyed by the conveyance unit, and a cutting unit that cuts the thermal roll paper.

The configuration of the second printer KP2 and third printer KP3 is the same as the first printer KP1. The second printer KP2 includes a second control unit 502, second communication unit 512, and second print unit 522. The third printer KP3 includes a third control unit 503, third communication unit 513, and third print unit 523.

Note that printer KP is used below when not specifically differentiating between the first printer KP1, second printer KP2, and third printer KP3.

The operation of the first POS terminal PT1 and first print data distribution server SV1 when a user (such a waiter in this example) inputs transaction information to the first POS terminal PT1 according to the customer's transaction is described next.

When transaction input is detected, the first POS terminal PT1 generates information related to the transaction ("transaction-related information" below) based on the user input. This transaction-related information includes the information printed on the receipt, such as the name, price, and quantity of each of the food and drink items ordered by the customer, the transaction total, the amount of change due, and tax information. In other words, the first POS terminal PT1 generates the transaction-related information each time a transaction is processed and the transaction is finalized.

Next, the first POS terminal PT1 sends the generated transaction-related information and identification information for the control printer SP to the first print data distribution server SV1. The identification information of the control printer SP is information uniquely identifying a particular control printer SP, such as the serial number assigned to the control printer SP when the control printer SP was manufactured. As described above, a corresponding receipt is produced by the control printer SP when information for a particular transaction is input to the first POS terminal PT1.

When transmitting the transaction-related information, the first POS terminal PT1 sends the identification information of the printer for printing a receipt with the transaction-related information (the control printer SP in this example) together with the transaction-related information. Note that the information required for the first POS terminal PT1 to transmit to the first print data distribution server SV1, such as the address of the first print data distribution server SV1, the protocol used for communication, and the format of transmitted data, is previously registered in the first POS terminal PT1. The first POS terminal PT1 establishes a connection according to a specific communication protocol with the first print data distribution server SV1, and transmits the transaction-related information through this connection.

The first server control unit 201 of the first print data distribution server SV1 controls the first server communication unit 211 to receive the transaction-related information and the identification information of the control printer SP.

Next, the first server control unit 201 generates and stores receipt print data (print data) in the first server storage unit 221 based on the received transaction-related information and control printer SP identification information.

The receipt print data is an XML (Extensible Markup Language) file that controls printing of a receipt with the transaction-related information. The receipt print data contains information required for printing, such as the identification information of the printer that is to print, the transaction-related information, and information about where to print the information contained in the transaction-related information, according to the XML protocol.

Therefore, when transaction-related information is received from the first POS terminal PT1, the first print data distribution server SV1 generates and stores receipt print data based on the transaction-related information.

The operation of the second POS terminal PT2 and first print data distribution server SV1 when the user (such as a waiter in this example) inputs transaction information to the second POS terminal PT2 according to the customer's transaction is the same as described above.

More specifically, the second POS terminal PT2 generates transaction-related information according to the transaction, and sends the generated transaction-related information with the identification information of the first printer KP1, which is the printer for printing the receipt, to the first print data distribution server SV1. The first print data distribution server SV1 generates and stores receipt print data based on the received transaction-related information and first printer KP1 identification information in the first server storage unit 221. The first printer KP1 identification information is included in the receipt print data.

The first POS terminal PT1 and second POS terminal PT2 thus generate and send transaction-related information to the first print data distribution server SV1 according to the transaction.

Note that how the receipt print data stored in the first server storage unit 221 is used is described further below.

The operation of the tablet terminal 10, second print data distribution server SV2, and third print data distribution server SV3 when the user (a waiter in this example) inputs a customer's order to the tablet terminal 10 is described next.

In this example plural tablet terminals 10 are assigned to plural waiters. A dedicated application AP is preinstalled to the tablet terminal 10. The waiter starts the application AP before taking an order from the customer.

The function of the application execution unit 30a of the terminal control unit 30 of the tablet terminal 10 is embodied by a CPU and other hardware resources reading and running the application AP.

The application execution unit 30a of the terminal control unit 30 of the tablet terminal 10 displays a user interface ("order interface" below) enabling the user to input order information on the display panel 31a. The order interface has an area for selecting the food and drink items ordered by the customer and an area for selecting the quantity of the ordered items, and the user inputs the food and drink items and the quantities ordered by the customer by touching the touch panel 31.

When input related to an order is detected through the order interface, the application execution unit 30a generates information related to the order ("order-related information" below) based on the input. The order-related information includes at least information indicating the names of the food and drink items and the quantity for each of the one or more items ordered by the customer.

Next, the application execution unit 30a sends the generated order-related information and the identification information of the printer to produce an order ticket based on the order-related information to whichever of the second print data distribution server SV2 and the third print data distribution server SV3 that was previously set as the print data distribution server SV to receive the information.

Based on the content of the order-related information, the application execution unit 30a determines which of the second printer KP2 and third printer KP3 is to print the order ticket. The application execution unit 30a sends the identification information of the selected printer with the order-related information. Alternatively, a configuration in which the printer used to produce order tickets is preset for each tablet terminal 10, and a configuration in which the printer status is acquired by a specific means and which printer is to produce the order ticket is determined according to the printer status, are also possible.

In this example, whether the generated order-related information is sent to the second print data distribution server SV2 or the third print data distribution server SV3 is preset for each tablet terminal 10. The information (such as the address) required to communicate with the preset print data distribution server SV is also preregistered in each tablet terminal 10.

If the set print data distribution server SV is the second print data distribution server SV2, the second server control unit 202 controls the second server communication unit 212 to receive the order-related information and printer identification information sent by the tablet terminal 10.

Next, the second server control unit 202 generates and stores order ticket print data (print data) in the second server storage unit 222 based on the received order-related information and printer identification information.

The order ticket print data is an XML file that instructs the printing an order ticket printed with the order-related information. The order ticket print data contains the information required for printing, such as the identification information of the printer that is to print the order ticket, the order-related information, and information about where to print the information contained in the order-related information, according to the XML protocol.

When the second print data distribution server SV2 receives the order-related information from the tablet terminal 10, it generates and stores the order ticket print data based on the order-related information.

When the preset print data distribution server SV is the third print data distribution server SV3, and the third print data distribution server SV3 receives the order-related information from the tablet terminal 10, the same process is executed by the third print data distribution server SV3. More specifically, the third print data distribution server SV3 generates and stores order ticket print data based on the received order-related information and the printer identification information in the third server storage unit 223.

Note that print data is used below when not differentiating between the receipt print data and order ticket print data. The print data is an XML file.

The function blocks of the control printer control unit 40 of the control printer SP are described next.

Figure 5:
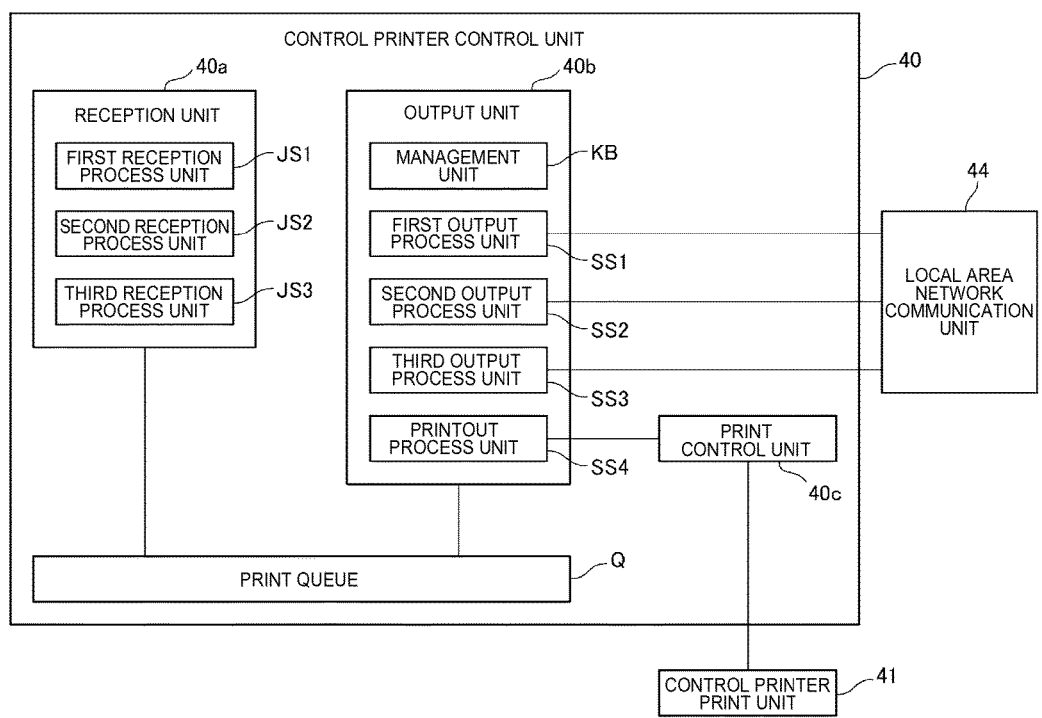
FIG. 5 is a function block diagram of main parts of the control printer.

FIG. 5 illustrates the configuration of the control printer control unit 40 in detail.

As shown in FIG. 5, function blocks of the control printer control unit 40 include reception unit 40a, output unit 40b, and print control unit 40c.

The reception unit 40a includes a first reception process unit JS1 (reception process unit), a second reception process unit JS2 (reception process unit), and a third reception process unit JS3 (reception process unit).

In this embodiment, a first reception task, second reception task, and third reception task are started as tasks (threads or processes) when the control printer SP power turns on or the control printer SP resets. The first reception process unit JS1 is a function block that executes a process based on the CPU executing the first reception task. The second reception process unit JS2 is a function block that executes a process based on the CPU executing the second reception task. The third reception process unit JS3 is a function block that executes a process based on the CPU executing the third reception task. More specifically, the first reception process unit JS1, second reception process unit JS2, and third reception process unit JS3 start when the control printer SP is started. The processes executed by the first reception process unit JS1, second reception process unit JS2 and third reception process unit JS3 are described further below.

Note that reception process unit JS is used below when not differentiating between the first reception process unit JS1, second reception process unit JS2, and third reception process unit JS3.

As shown in FIG. 5, the output unit 40b includes a management unit KB, first output process unit SS1 (output process unit), second output process unit SS2 (output process unit), third output process unit SS3 (output process unit), and printout process unit SS4 (output process unit).

The management unit KB is a function block corresponding to the management task that starts when the control printer SP turns on. More specifically, the management unit KB executes a process based on execution of the management task by the CPU. As described further below, when a specific condition is satisfied, the management unit KB starts a first output task, second output task, third output task, or print output task as a task (thread or process).

The first output process unit SS1 is a function block that runs a process based on the CPU executing the first output task. The second output process unit SS2 is a function block that runs a process based on the CPU executing the second output task. The third output process unit SS3 is a function block that runs a process based on the CPU executing the third output task. The printout process unit SS4 is a function block that runs a process based on the CPU executing the print output task. The processes executed by the management unit KB, first output process unit SS1, second output process unit SS2, third output process unit SS3, and printout process unit SS4 are described further below.

Note that when not differentiating therebetween, the first output process unit SS1, second output process unit SS2, and third output process unit SS3 are referred to as transmission process units S. Likewise, the first output process unit SS1, second output process unit SS2, third output process unit SS3, and printout process unit SS4 are referred to as output process units SS.

A function block of the reception unit 40a and a function block of the output unit 40b can write data to the print queue Q (storage area), and can read data from the print queue Q.

The print queue Q is a buffer formed in the working area of a transient storage medium such as RAM.

Print data is input to the print control unit 40c under specific conditions as described further below. The print control unit 40c converts the input print data (XML file) to control commands in the command language of the control printer print unit 41, and causes the control printer print unit 41 to execute a process based on the control commands.

Configuration of the control printer SP is described next.

As described above, when the control printer SP starts, the first reception process unit JS1, the second reception process unit JS2, the and third reception process unit JS3 start. This embodiment enables accessing the control printer SP and configuring each reception process unit JS through the wide-area network WN from a device with an installed browser.

In this embodiment, web server software (such as Apache HTTP Server) is installed on the control printer SP. The control printer SP can function as a web server that generates and outputs display data according to a specific communication protocol such as HTTP in response to a request from a client.

A browser is also installed on the tablet terminal 10.

An example of accessing the control printer SP from the tablet terminal 10 to configure the reception process unit JS is described below.

The user starts the browser on the tablet terminal 10, and accesses a specific URL managed by the control printer SP. In response to accessing the specific URL, the control printer control unit 40 of the control printer SP generates and outputs a display file for displaying a user interface (referred to below as the configuration interface) for configuring the reception process unit JS. The terminal control unit 30 of the tablet terminal 10 then displays the configuration interface on the display panel 31a based on the display file.

FIG. 6 shows an example of the configuration interface.

As shown in FIG. 6, the configuration interface has a direct printing setting field R1 for enabling or disabling direct printing. Direct printing enables the print data distribution server SV to send print data directly to the control printer SP.

The configuration interface also has an ID and password input field R2. The ID and password input field R2 has a field for inputting the identification information of the control printer SP, and a field for inputting the password set relationally to the identification information of the control printer SP. The information input to this ID and password input field R2 is used for identification and authentication of the control printer SP.

The configuration interface also has a first server settings field R3. The first server settings field R3 is a field for configuring the first reception process unit JS1. The first server settings field R3 also has a first URL input field R31. As described further below, the first reception process unit JS1 executes a process that receives print data from the first print data distribution server SV1. The first URL input field R31 is a field for inputting the URL of the server (the first print data distribution server SV1 in this example) accessed when the first reception process unit JS1 receives print data.

The first server settings field R3 also has a first interval input field R32. As described further below, to receive print data from the first print data distribution server SV1, the first reception process unit JS1 queries the server for print data at a specific interval (such as a specific time interval). The first interval input field R32 is a field for inputting this interval.

The information input to the first URL input field R31 and first interval input field R32 is written to a registry file referenced by the program that embodies the function of the first reception process unit JS1, and is stored or set to specific variables defined by the program.

The configuration interface also has a second server settings field R4.

The second server settings field R4 is a field for configuring the second reception process unit JS2. The second server settings field R4 has a second URL input field R41 and a second interval input field R42. As described further below, the second reception process unit JS2 executes a process for receiving print data from the second print data distribution server SV2. The second URL input field R41 is a field for inputting the URL of the server (the second print data distribution server SV2 in this example) accessed when the second reception process unit JS2 receives print data. The second interval input field R42 is a field for inputting the interval at which the second reception process unit JS2 queries the second print data distribution server SV2 for print data.

The configuration interface also has a third server settings field R5.

The third server settings field R5 is a field for configuring the third reception process unit JS3. The third server settings field R5 has a third URL input field R51 and a third interval input field R52. As described further below, the third reception process unit JS3 executes a process for receiving print data from the third print data distribution server SV3. The third URL input field R51 is a field for inputting the URL of the server (the third print data distribution server SV3 in this example) accessed when the third reception process unit JS3 receives print data. The third interval input field R52 is a field for inputting the interval at which the third reception process unit JS3 queries the third print data distribution server SV3 for print data.

The reception process unit JS in this embodiment of the invention can thus query the server for print data at a specific time interval, and this specific image can be set for each reception process unit JS.

Note that because there are three print data distribution servers SV with which the control printer SP communicates in this example, there are three configuration fields corresponding to the individual print data distribution servers SV, and the number of configuration fields may be increased or decreased according to the number of servers to communicate with.

The configuration interface also has a server authentication field R6.

The server authentication field R6 is a field for setting whether or not to authenticate the server on the control printer SP side when establishing a connection with the print data distribution server SV.

The configuration interface also has an Apply button B1.

When the Apply button B1 is clicked, the input to the configuration interface is confirmed and the input information is sent to the control printer SP. The control printer SP then reflects the input based on the received information.

Operation of the control printer SP is described next.

The control printer SP receives print data from the print data distribution server SV, and based on the received print data either sends the received print data to the appropriate printer KP or prints based on the print data.

The process run by the control printer SP to receive print data is described first.

Figure 7:
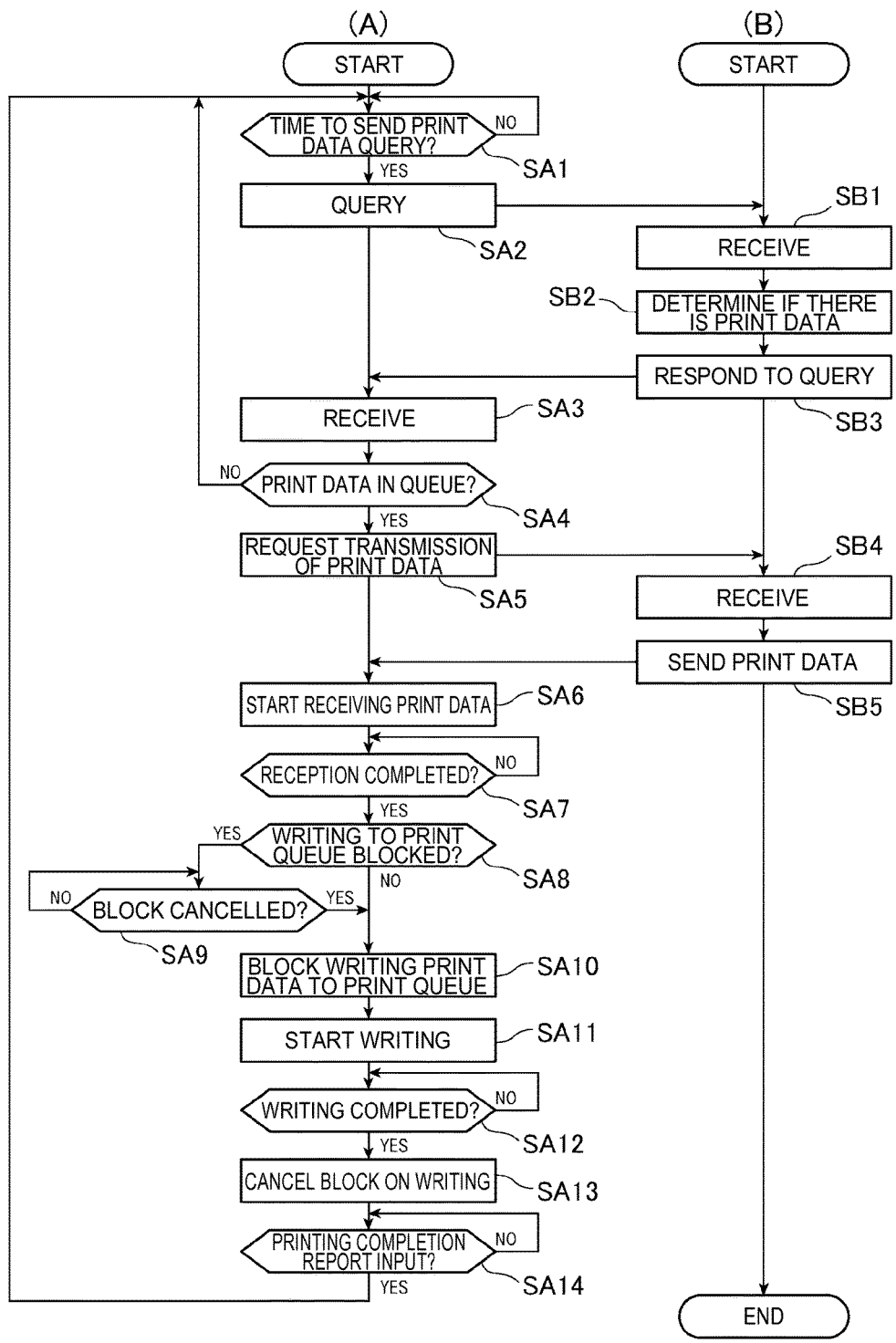
FIG. 7 is a flow chart in which (A) describes the operation of the control printer, and (B) describes the operation of the print data distribution server.

FIG. 7 is a flow chart describing the operation of the control printer SP and the first print data distribution server SV1 when the control printer SP receives print data from an print data distribution server SV, (A) showing the operation of the control printer SP and (B) showing the operation of the first print data distribution server SV1.

As described above, when the control printer SP starts, the first reception process unit JS1, the second reception process unit JS2, the and third reception process unit JS3 start.

The first reception process unit JS1 executes a process of receiving print data from the first print data distribution server SV1, that is, the server designated in the group of three print data distribution servers SV. Likewise, the second reception process unit JS2 executes a process of receiving print data from the second print data distribution server SV2. The third reception process unit JS3 likewise executes a process of receiving print data from the third print data distribution server SV3.

The process executed by the first reception process unit JS1 is described below with reference to the flow chart in FIG. 7. Note that detailed description of the processes executed by the second reception process unit JS2 and third reception process unit JS3 is omitted below, but the second reception process unit JS2 executes the same process as shown in FIG. 7 with the second print data distribution server SV2. The third reception process unit JS3 also executes the same process as shown in FIG. 7 with the third print data distribution server SV3.

As shown in (A) in FIG. 7, the first reception process unit JS1 of the reception unit 40a of the control printer control unit 40 of the control printer SP monitors whether it is time to query the first print data distribution server SV1 for print data (step SA1).

Except during the print data processing period described below, the first reception process unit JS1 queries the first print data distribution server SV1 for print data at the interval (specific time) input to the first interval input field R32 of the first server settings field R3 in the configuration interface. In step SA1, the first reception process unit JS1 checks if the time (specific time) corresponding to the set interval has past since the last query, and if the time has past, determines that it is time to query the server for print data.

When the query time is reached (step SA1 returns YES), the first reception process unit JS1 generates data to query the server for print data, and controls the wide-area network communication unit 43 to send the query data to the first print data distribution server SV1 (step SA2).

As described above, the URL (the URL of the first print data distribution server SV1) input to the first URL input field R31 of the first server settings field R3 is stored in a registry (configuration) file, and the first reception process unit JS1 manages the URL. In step SA2, the first reception process unit JS1 accesses the first print data distribution server SV1 based on the managed URL, opens a connection according to a specific communication protocol, and sends the data through the connection.

As shown in (B) in FIG. 7, the first server control unit 201 of the first print data distribution server SV1 controls the first server communication unit 211 to receive the data (step SB1).

Next, the first server control unit 201 determines if there is any print data that has not been sent (step SB2).

More specifically, as described above, when transaction-related information and the identification information of the printer to print the receipt is received from the first POS terminal PT1 or the second POS terminal PT2, the first server control unit 201 generates and stores receipt print data (print data) in the first server storage unit 221 based on the received information. In step SB2, the first server control unit 201 determines whether there print data stored in the first server storage unit 221 that has not been sent to the control printer SP. More specifically, in step SB2, the first server control unit 201 determines whether or not there is new print data that has been stored since the last time print data was transmitted.

Next, based on the result of this decision, the first server control unit 201 controls the first server communication unit 211 to send data including information indicating whether or not there is any print data that has not been sent using the connection established in step SA2 (step SB3).

As shown in (A) in FIG. 7, the first reception process unit JS1 of the control printer SP controls the wide-area network communication unit 43 to receive the data sent by the first print data distribution server SV1 (step SA3).

Next, the first reception process unit JS1 returns to step SA1 if the received data contains information indicating that there is no print data that has not been transmitted (step SA4 returns NO).

If the received data contains information indicating that there is print data that has not been transmitted (step SA4 returns YES), the first reception process unit JS1 uses the established connection to send data requesting transmission of the print data (step SA5).

As shown in (B) in FIG. 7, the first server control unit 201 of the first print data distribution server SV1 receives the data (step SB4).

Next, the first server control unit 201 uses the established connection to send the unsent print data (step SB5). If there is print data for plural print jobs to send, the first server control unit 201 sequentially transmits the print data for each job.

As shown in (A) in FIG. 7, in response to transmission of print data by the first print data distribution server SV1, the first reception process unit JS1 of the control printer SP starts receiving the print data (step SA6). The first reception process unit JS1 sequentially stores the received data to the receive buffer created in RAM or other working memory, for example, while receiving the print data.

After starting to receive the print data, the first reception process unit JS1 monitors whether or not print data reception is completed (step SA7). If print data for plural jobs is received, in step SA7 the first reception process unit JS1 monitors whether or not receiving the print data for all jobs has been completed.

When reception of the print data is completed (step SA7 returns YES), the first reception process unit JS1 determines whether or not writing (storing) data to the print queue Q is prohibited (step SA8). As described further below, when the first reception process unit JS1, the second reception process unit JS2, or third reception process unit JS3 is writing data to the print queue Q, writing data to the print queue Q by another reception process unit JS is prohibited.

When one reception process unit JS blocks writing by the other two reception process units JS, the one r.p.u. JS reports the same to the other two reception process units JS. When the block on writing data to the print queue Q is cancelled, the one reception process unit JS reports the same to the other two reception process units JS. After being informed by another reception process unit JS that writing data to the print queue Q is blocked in step SA8, the first reception process unit JS1 determines that writing data is prohibited until it receives a report indicating that the writing block has been cancelled.

If writing data to the print queue Q is blocked (step SA8 returns YES), the first reception process unit JS1 continues to check if the block has been cancelled (step SA9), and when the block is cancelled (step SA9 returns YES), goes to step SA10.

If writing data to the print queue Q is not blocked (step SA8 returns NO), the first reception process unit JS1 goes to step SA10.

In step SA10, the first reception process unit JS1 blocks writing data to the print queue Q by the other two reception process units JS. More specifically, the first reception process unit JS1 sends a report indicating the writing data is blocked to the other two reception process units JS.

Next, the first reception process unit JS1 starts writing (storing) the print data (print data for plural jobs when plural jobs are stored) stored in the receive buffer to the print queue Q (step SA11).

Next, the first reception process unit JS1 checks whether writing the print data stored in the receive buffer to the print queue Q has been completed (step SA12).

If writing has been completed (step SA12 returns YES), the first reception process unit JS1 cancels the block on writing data by the other reception process units JS (step SA13).

More specifically, the first reception process unit JS1 reports to the other two reception process units JS that writing data is enabled again by sending an interrupt signal, for example.

Next, the first reception process unit JS1 checks whether a printing process completion report was input (step SA14).

As will be understood below, a printing process completion report is a report that is input from the management unit KB when printing based on the print data (print data for plural jobs when plural jobs are received) received from the first print data distribution server SV1 is completed.

When a printing process completion report is input (step SA14 returns YES), the first reception process unit JS1 returns to step SA1.

The first reception process unit JS1 thus does not query the server for print data during the period from starting to receive print data from the first print data distribution server SV1 until printing based on the received print data is completed (the print data processing period).

As described above, plural print data distribution servers SV are connected to the control printer SP in this embodiment of the invention. Plural reception process units JS corresponding to the plural print data distribution servers SV are initaited on the control printer SP. Each reception process unit JS executes the process shown in FIG. 7 to receive print data from the corresponding print data distribution server SV and store print data in a common print queue Q independently of the other reception process units JS. Thus comprised, a reception process unit JS can independently receive print data from the corresponding print data distribution server SV, and can efficiently receive print data in a configuration having plural print data distribution servers SV connected to the control printer SP, without being affected by processes on the other reception process units JS and without affecting processes on the other reception process units JS. For example, the throughput of the process related to receiving print data can be improved compared with a configuration having a single print data distribution server SV connected to the control printer SP, and the control printer SP receiving print data from the server and querying the server for more print data after finishing printing based on the print data received first [[something missing, what is advantage]].

When one reception process unit JS of the plural reception process units JS writes (stores) print data to the print queue Q, writing (storing) data to the print queue Q by any of the other reception process units JS is blocked. As a result, print data can be stored to the print queue Q in the order received.

For example, assume the second reception process unit JS2 starts receiving print data D1 and print data D2 from the second print data distribution server SV2. Print data D1 and print data D2 are both print data containing identification information for the second printer KP2 (meaning print data to be processed by the second printer KP2). At the same time, the third reception process unit JS3 receives print data D3 from the third print data distribution server SV3. This print data D3 is print data containing the identification information for the second printer KP2 (meaning print data to be processed by the second printer KP2). The second reception process unit JS2 completes reception before the third reception process unit JS3 completes reception. In this event, the print data must be stored in the order print data D1, print data D2, print data D3 to the print queue Q. This is because the print data is desirably processed in the order that reception is completed, and by storing the print data in the print queue Q in this order, the print data is processed in this order as described further below. This embodiment of the invention can store the print data in this order in the print queue Q. However, if other reception process units JS are not blocked from storing data to the print queue Q when one reception process unit JS is storing data to the print queue Q, the print data will not necessarily be stored in the order received, and print data may be stored to the print queue Q in the order print data D1, print data D3, print data D2.

Processing print data received by the control printer SP is described next.

As described above, when not differentiating between the first output process unit SS1, the second output process unit SS2, and the third output process unit SS3, transmission process unit S is used. When not differentiating between the first output process unit SS1, the second output process unit SS2, the third output process unit SS3, and the printout process unit SS4, output process unit SS is used.

As described above, when a specific condition is met, the management unit KB initiates the first output process unit SS1, second output process unit SS2, third output process unit SS3, or printout process unit SS4. The process executed by the transmission process units S (first output process unit SS1, second output process unit SS2, and third output process unit SS3), and the process executed by the printout process unit SS4, are different.

The process of the first output process unit SS1 is described next with reference to FIG. 8, and then the process of the printout process unit SS4 is described with reference to FIG. 9.

Figure 8:
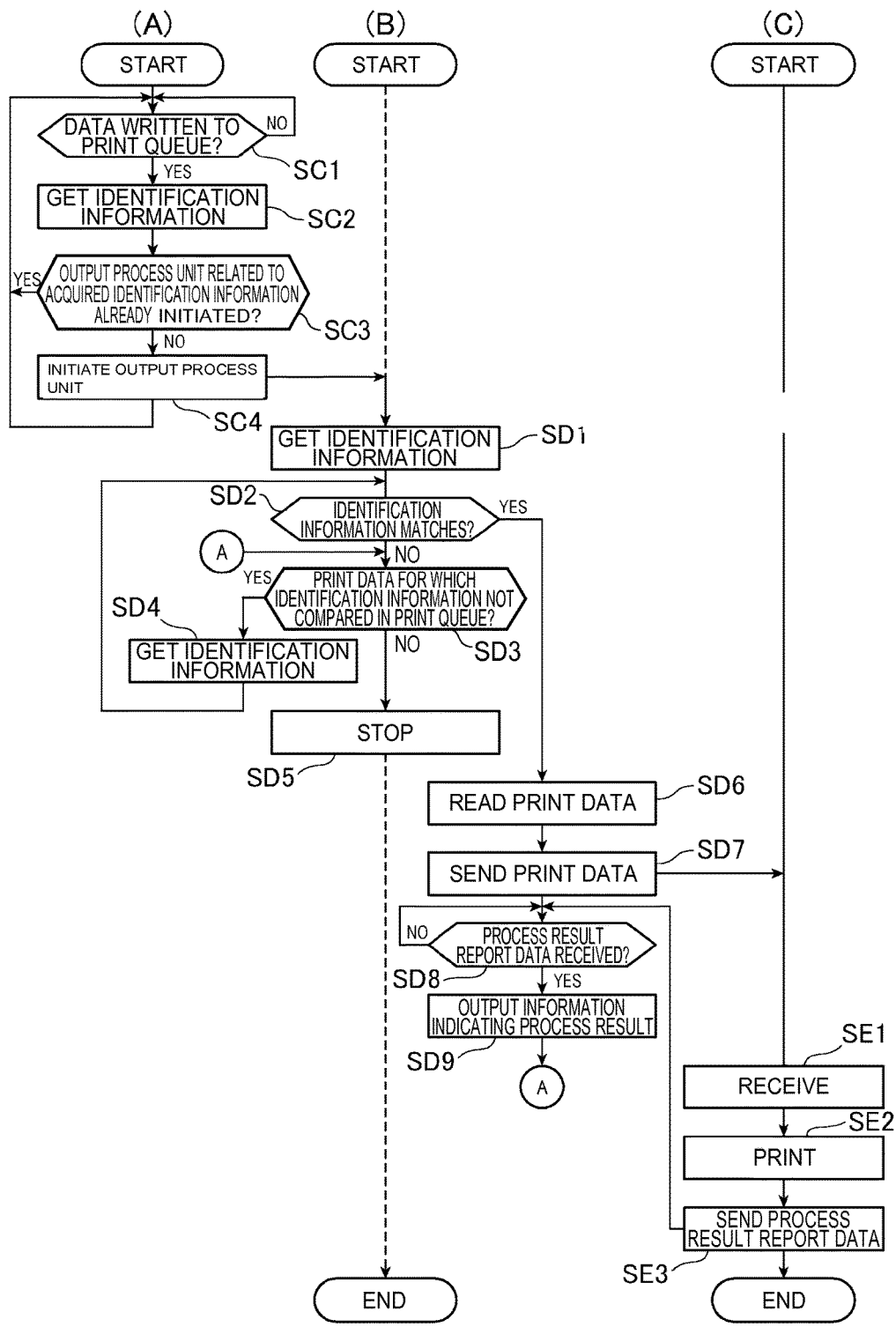
FIG. 8 is a flow chart in which (A) and (B) describe the operation of the control printer, and (C) describes the operation of the first printer.

(A) in FIG. 8 is a flow chart describing the operation of the management unit KB, (B) in FIG. 8 is a flow chart describing the operation of the first output process unit SS1, and (C) in FIG. 8 is a flow chart describing the operation of the first printer KP1.

As shown in (A) in FIG. 8, the management unit KB monitors if one of the reception process units JS wrote print data to the print queue Q (step SC1). That print data was written means that after writing to the print queue Q started, writing that set of print data was completed, and if print data for plural jobs is written, the writing the print data for the plural jobs is completed.

When print data is written to the print queue Q (step SC1 returns YES), the management unit KB references the content of the print data, and gets the printer identification information contained in the print data (step SC2). If print data for plural jobs is written, the management unit KB gets the printer identification information contained in the print data of the plural jobs.

Next, the management unit KB determines whether an output process unit SS corresponding to the acquired printer identification information was initiated (transmission process unit S or printout process unit SS4) (step SC3). If identification information is acquired for plural printers in step SC2, the management unit KB determines whether an output process unit SS was initiated for the identification information of the plural printers.

The output process unit SS corresponding to the identification information of the first printer KP1 is the first output process unit SS1. The output process unit SS corresponding to the identification information of the second printer KP2 is the second output process unit SS2. The output process unit SS corresponding to the identification information of the third printer KP3 is the third output process unit SS3. The output process unit SS corresponding to the identification information of the control printer SP is the printout process unit SS4.

When the output process unit SS corresponding to the printer identification information acquired in step SC2 is initiated (step SC3 returns YES), the management unit KB returns to step SC1. In this event, as will be understood below, the print data written to the print queue Q is processed by the output process unit SS that was already initiated.

If an output process unit SS has not been initiated for any printer identified by the printer identification information acquired in step SC2 (step SC3 returns NO), the management unit KB initiates the output process unit SS corresponding to the identification information of the uninitiated output process unit SS (step SC4). For example, if the acquired printer identification information is the identification information of the first printer KP1, and the first output process unit SS1 has not been initiated, the management unit KB initiates the first output process unit SS1 by starting the first output task.

The process executed by the first output process unit SS1 is described below with reference to FIG. 8 based on the management unit KB initiating the first output process unit SS1 in step SC4. Detailed description of the processes executed by the second output process unit SS2 and the third output process unit SS3 is omitted below as these output process units SS execute the same process after instantiation.

As shown in (B) in FIG. 8, the first output process unit SS1 references the content of the unread print data stored in the print queue Q that was written earliest to the print queue Q, and acquires the printer identification information contained in that print data (step SD1).

Next, the first output process unit SS1 determines whether the acquired printer identification information and the identification information of the first printer KP1 (corresponding identification information) match (step SD2). In the corresponding step SD2, the second output process unit SS2 determines whether the acquired printer identification information matches the identification information of the second printer KP2, and the third output process unit SS3 determines whether the acquired printer identification information matches the identification information of the third printer KP3.

If the identification information does not match (step SD2 returns NO), the first output process unit SS1 determines whether there is any print data in the print queue Q that is unread and has not been processed to acquire the identification information in step SD1 and for comparison in step SD2 (step SD3).

If there is such print data (step SD3 returns YES), the first output process unit SS1 acquires from the unread print data the identification information in the print data stored next after the last print data from which the identification information was acquired and compared (step SD4), and then returns to step SD2.

If there is no such print data (step SD3 returns NO), the first output process unit SS1 ends processing by stopping the first output task (step SD5).

If in step SD2 the acquired printer identification information and the identification information of the first printer KP1 match (step SD2 returns YES), the first output process unit SS1 reads the print data from which the printer identification information was acquired from the print queue Q (step SD6).

Next, the first output process unit SS1 controls the local-area network communication unit 44 and sends (outputs) the read print data to the first printer KP1 (step SD7). The first output process unit SS1 previously acquires and manages the information required to send data to the first printer KP1, such as the IP address or MAC address of the first printer KP1.

As shown in (C) in FIG. 8, the first control unit 501 of the first printer KP1 controls the first communication unit 511 to receive the print data (step SE1).

Next, the first control unit 501 converts the received print data to control commands in the command language of the first print unit 521, and based on these control commands, controls the first print unit 521 to execute a process based on the control commands (step SE2). Because the print data is receipt print data, a receipt is produced by the first printer KP1 as the result of step SE2.

Next, the first control unit 501 generates data indicating the result of processing the print data (referred to as "process result report data" below), and controls the first communication unit 511 to transmit to the control printer SP (step SE3).

As shown in (B) in FIG. 8, the first output process unit SS1 of the control printer SP monitors whether or not the process result report data is received after sending the print data (step SD8).

If the process result report data is received (step SD8 returns YES), the first output process unit SS1 outputs information indicating the process result by means of an interrupt, for example, to the management unit KB (step SD9). How the information indicating the process result is used by the management unit KB is described further below.

Next, the first output process unit SS1 proceeds to step SD3.

As described above, the first output process unit SS1 is a function block for sending print data to the first printer KP1. Operation of the first output process unit SS1 is triggered by storing print data containing the identification information of the first printer KP1 in the print queue Q. After initiation, the first output process unit SS1 determines, in the order in which the print data is stored in the print queue Q (in other words, the order in which the print data is received), whether or not the identification information contained in unread print data stored in the print queue Q matches the identification information of the first printer KP1. If the identification information matches, the first output process unit SS1 reads and sends the print data with matching identification information to the first printer KP1.

Thus comprised, the first output process unit SS1 can transmit print data to be processed by the first printer KP1 in the order the print data is stored to the print queue Q, that is, in the order the print data is received. For example, if plural process units with the ability to transmit data to the first printer KP1 are initiated, and the plural process units are constructed to independently read and transmit the print data, the print data may not be transmitted in the order the print data was received. However, the embodiment thus described can prevent this from happening.

The first output process unit SS1 stops when there is no unread print data to be processed by the first printer KP1 in the print queue Q. More specifically, the first output process unit SS1 stops when there is no need for processing by the first output process unit SS1. As a result, the first output process unit SS1 remaining initiated when there is no need for it can be suppressed, and the CPU and other hardware resources and other resources can be used effectively.

The foregoing also applies to the second output process unit SS2 and the third output process unit SS3.

Operation of the printout process unit SS4 and the print control unit 40c after the management unit KB initiates the printout process unit SS4 is described next.

Figure 9:
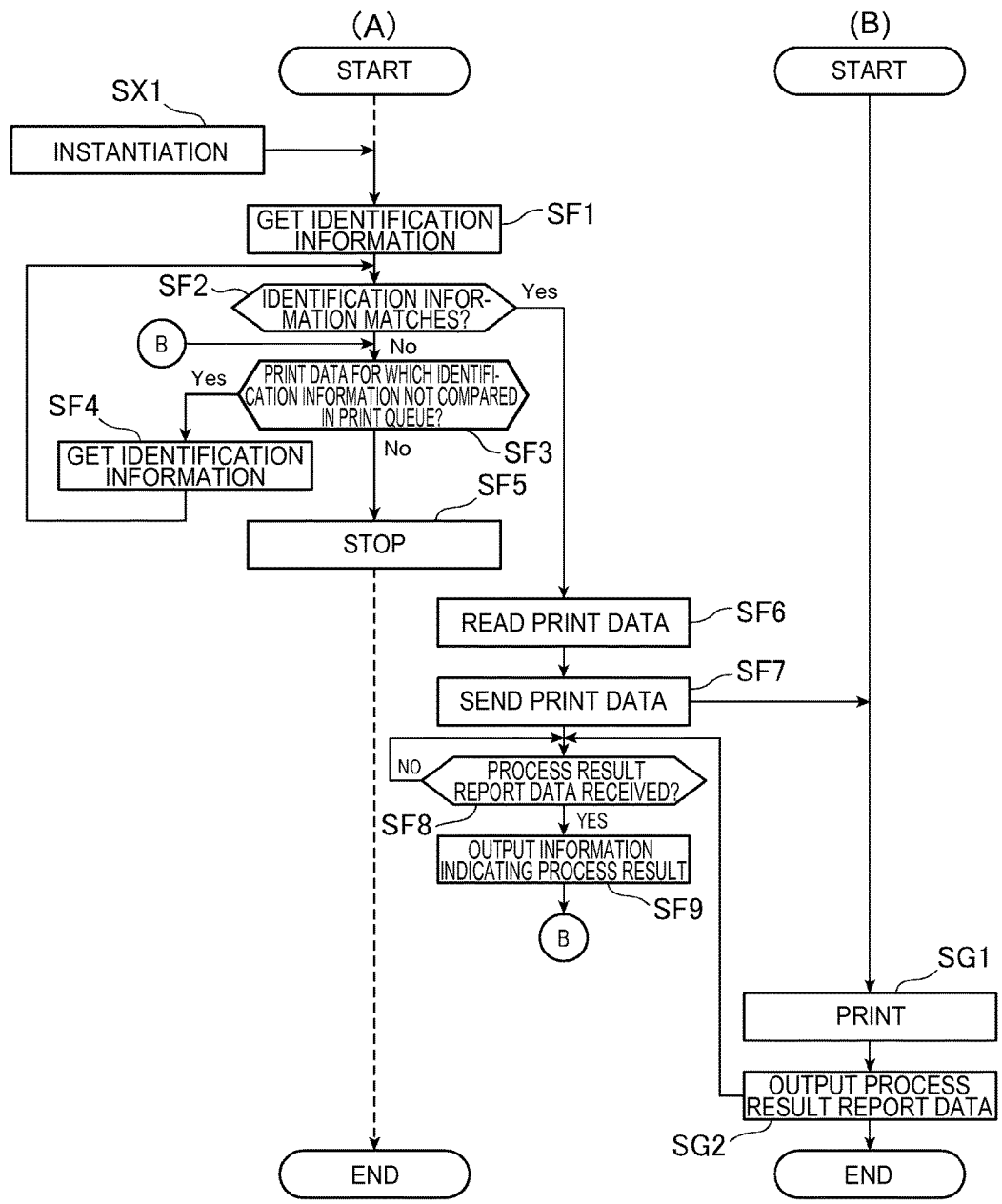
FIG. 9 is a flow chart describing the operation of the control printer.

(A) in FIG. 9 is a flow chart describing the operation of the printout process unit SS4, and (B) in FIG. 9 is a flow chart describing the operation of the print control unit 40c.

If the printout process unit SS4 is not initiated when print data containing the identification information of the control printer SP is stored to the print queue Q, the management unit KB initiates the printout process unit SS4 by starting the print output task (step SX1).

As shown in (A) in FIG. 9, the printout process unit SS4 references the content of the unread print data stored in the print queue Q that was written earliest to the print queue Q, and acquires the printer identification information contained in that print data (step SF1).

Next, the printout process unit SS4 determines whether the acquired printer identification information and the identification information of the control printer SP (corresponding identification information) match (step SF2).

If the identification information does not match (step SF2 returns NO), the printout process unit SS4 determines if there is any print data in the print queue Q that is unread and has not been processed to acquire and compare the identification information in step SF2 (step SF3).

If there is such print data (step SF3 returns YES), the printout process unit SS4 acquires from the unread print data the identification information in the print data stored next after the last print data from which the identification information was acquired and compared (step SF4), and then returns to step SF2.

If there is no such print data (step SF3 returns NO), the printout process unit SS4 ends processing by stopping the print output task (step SF5).

If in step SF2 the acquired printer identification information and the identification information of the control printer SP match (step SF2 returns YES), the printout process unit SS4 reads the print data from which the printer identification information was acquired from the print queue Q (step SF6).

Next, the printout process unit SS4 outputs the read print data to the print control unit 40c (step SF7).

As shown in (B) in FIG. 9, the print control unit 40c converts the print data to control commands in the command language of the control printer print unit 41, and based on these control commands, controls the control printer print unit 41 to execute a process based on the control commands (step SG1). Because the print data is receipt print data, a receipt is produced by the control printer SP as the result of step SG1.

Next, the print control unit 40c outputs information indicating the result of processing the print data to the printout process unit SS4 (step SG2).

As shown in (A) in FIG. 9, the printout process unit SS4 monitors whether or not information indicating the process result was input after sending the print data (step SF8).

If information indicating the process result was input (step SF8 returns YES), the printout process unit SS4 outputs information indicating the process result by means of an interrupt, for example, to the management unit KB (step SF9). How the information indicating the process result is used by the management unit KB is described further below.

Next, the printout process unit SS4 goes to step SF3.

As described above, operation of the printout process unit SS4 is triggered by storing print data containing the identification information of the control printer SP in the print queue Q. After initiation, the printout process unit SS4 determines, in the order in which the print data is stored in the print queue Q (in other words, the order the print data is received), whether or not the identification information contained in unread print data stored in the print queue Q matches the identification information of the control printer SP. If the identification information matches, the printout process unit SS4 reads and sends the print data with matching identification information to the print control unit 40c. The print control unit 40c then prints based on the print data.

Thus comprised, the printout process unit SS4 can process print data to be processed by the control printer SP in the order the print data is stored to the print queue Q, that is, in the order the print data is received. The printout process unit SS4 also stops when there is no unread print data to be processed by the control printer SP in the print queue Q. More specifically, the printout process unit SS4 stops when there is no need for processing by the printout process unit SS4. As a result, the printout process unit SS4 remaining initiated when there is no need for it can be suppressed, and the CPU and other hardware resources and other resources can be used effectively.

Another process of the management unit KB is described next.

Figure 10:
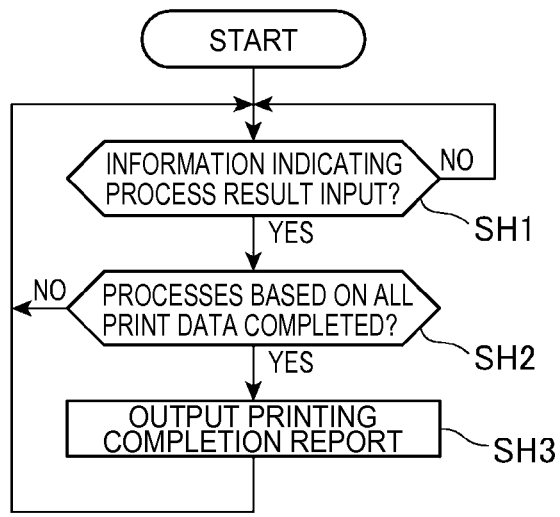
FIG. 10 is a flow chart describing the operation of the control printer.

FIG. 10 is a flow chart describing the operation of the management unit KB.

The management unit KB monitors whether or not information indicating the process result was input (step SH1).

When information indicating the process result is input (step SH1), the management unit KB determines, based on the input information, whether or not processing based on the print data has been completed for all print data stored in the print queue Q by a particular reception process unit JS (step SH2). All print data here means the print data for one job when the one reception process unit JS receives and stores print data for one job in the print queue Q, and means the print data for all jobs when the one reception process unit JS receives and stored print data for plural jobs in the print queue Q.

If processing all print data for the one reception process unit JS is not completed (step SH2 returns NO), the management unit KB returns to step SH1.

If processing all print data for the one reception process unit JS is completed (step SH2 returns YES), the management unit KB outputs a printing process completion report reporting that printing based on of the stored print data was completed to the reception process unit JS that stored the print data to the print queue Q (step SH3).

As described in step SA14 in FIG. 7, the reception process unit JS returns to step SA1 when triggered by input of the printing completion report, and starts querying the corresponding print data distribution server SV for print data.

As described above, a print data processing system 1 according to this embodiment has a plurality of print data distribution servers SV (print data distribution device), and a control printer SP (information processing device) that receives print data from the plural print data distribution servers SV.

The control printer SP initiates plural reception process units JS for the plural print data distribution servers SV. The reception process units JS query the print data distribution server SV for print data, receive the print data when print data is stored on the print data distribution server SV, and store the received print data in a shared print queue Q (storage area).

Thus comprised, a reception process unit JS can independently receive print data from the corresponding print data distribution server SV, and can efficiently receive print data in a configuration having plural print data distribution servers SV connected to the control printer SP, without being affected by processes on the other reception process units JS and without affecting processes on the other reception process units JS.

In this embodiment of the invention, while storing print data received from the print data distribution server SV to the print queue Q, the reception process unit JS blocks storing print data to the print queue Q by another reception process unit JS.

This configuration prevents print data received by a reception process unit JS from one print data distribution server SV, and print data received by another reception process unit JS from another print data distribution server SV from being mixed and stored together in the print queue Q, and can store the print data in the print queue Q in the order received.

Furthermore, in this embodiment, the reception process unit JS queries the server for print data at a specific time interval, and this specific time can be set separately for each reception process unit JS.

Thus comprised, the interval for querying each print data distribution server SV can be set appropriately to the system specifications and needs, such as shortening the interval for querying the print data distribution server SV that distributes print data having a high priority level and requiring prompt processing.

The print data processing system 1 according to this embodiment includes a print data distribution server SV, and a control printer SP that is connected to at least one printer KP (printing device) and receives print data including identification information for the printer KP from the print data distribution server SV.

The control printer SP has a reception unit 40a that receives print data from the print data distribution server SV and stores the print data in the order received to a print queue Q; and a management unit KB that initiates an output process unit SS corresponding to the identification information based on the identification information contained in print data stored in the print queue Q.

The output process unit SS reads print data containing the corresponding identification information from the print data stored in the print queue Q, and outputs to the printer KP identified by the identification information.

Thus comprised, by transmitting print data in the order received to the corresponding printer KP, the output process unit SS can transmit print data in the order received from the print data distribution server SV when transmitting print data received from the print data distribution server SV to the printer KP.

In this embodiment, the management unit KB initiates a new output process unit SS when a output process unit SS corresponding to the identification information contained in the print data is not initiated, and does not instantiate another output process unit SS when the output process unit SS already exists.

Thus comprised, plural duplicate output process units SS being initiated for one printer KP can be prevented.

Furthermore, in this embodiment the output process unit SS stops when there is no print data with the corresponding identification information that has not been read in the print queue Q.

Thus comprised, when one output process unit SS finishes reading print data from the print queue Q and further processing by that one output process unit SS is no longer required, that one output process unit SS remaining initiated can be suppressed.

In this embodiment of the invention, identification information for the printer KP or identification information for the control printer SP is contained in the print data. The control printer SP includes a control printer print unit 41 (print unit), and a print control unit 40c that controls the print unit based on the print data.

The management unit KB initiates a printout process unit SS4, which is an output process unit SS related to the identification information of the control printer SP, when print data containing the identification information of the control printer SP is stored in the print queue Q by the reception unit 40a. The printout process unit SS4 reads print data containing the identification information of the control printer SP from the print data stored in the print queue Q, and outputs the print data to the print control unit 40c in the order the print data was received.

Thus comprised, the control printer SP can process print data to be processed by the control printer SP and print in the order the print data is received.

An embodiment enabling the information processing device to receive print data with as short a time lag as possible after the print data distribution device becomes able to transmit print data is described below.

Figure 11:
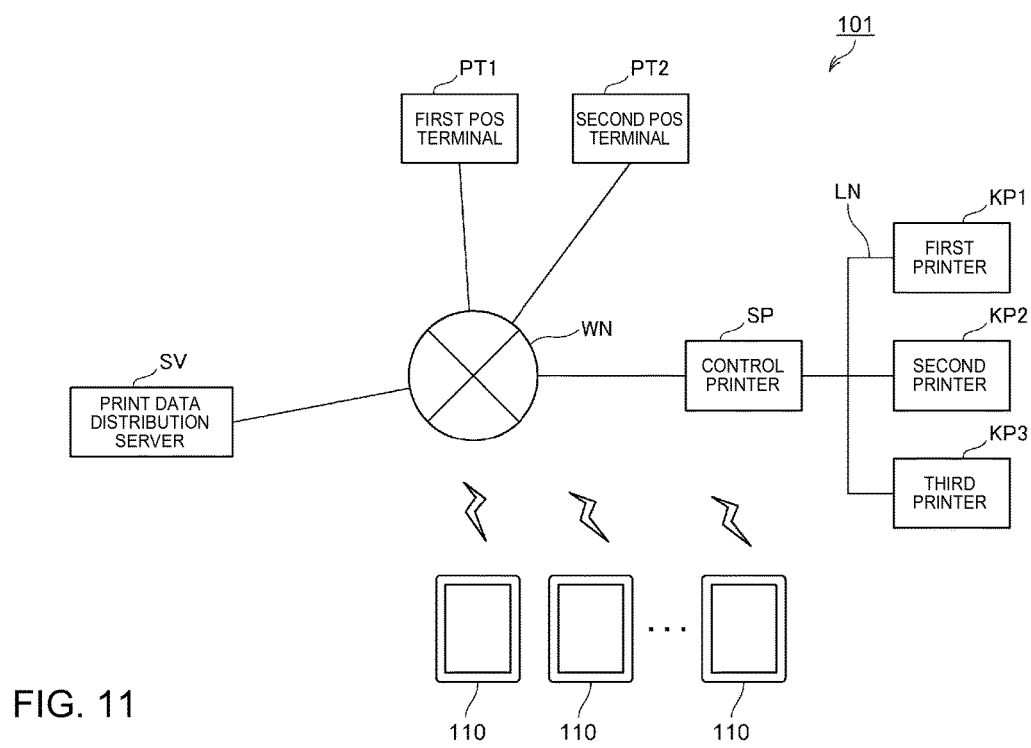
FIG. 11 is a network diagram of a print data processing system.

FIG. 11 is a network diagram of the print data processing system 101 according to this embodiment.

As shown in FIG. 11, the control printer SP of the print data processing system 101 connects to a wide-area network WN such as the Internet or a telecommunications network.

Each tablet terminal 110 assigned to the waiters in the dining room also connects to the wide-area network WN.

The print data processing system 101 may have one print data distribution server SV (print data distribution device). The print data distribution server SV is also connected to the wide-area network WN.

The control printer SP, tablet terminals 110 and the print data distribution server SV are connected to each other through the wide-area network WN.

As shown in FIG. 11, the control printer SP connects to an Ethernet (R) based local area network LN. Connected to the local area network LN are a first printer KP1, second printer KP2, and third printer KP3. The control printer SP can communicate with the first printer KP1, second printer KP2, and third printer KP3 through the local area network LN.

Figure 12:
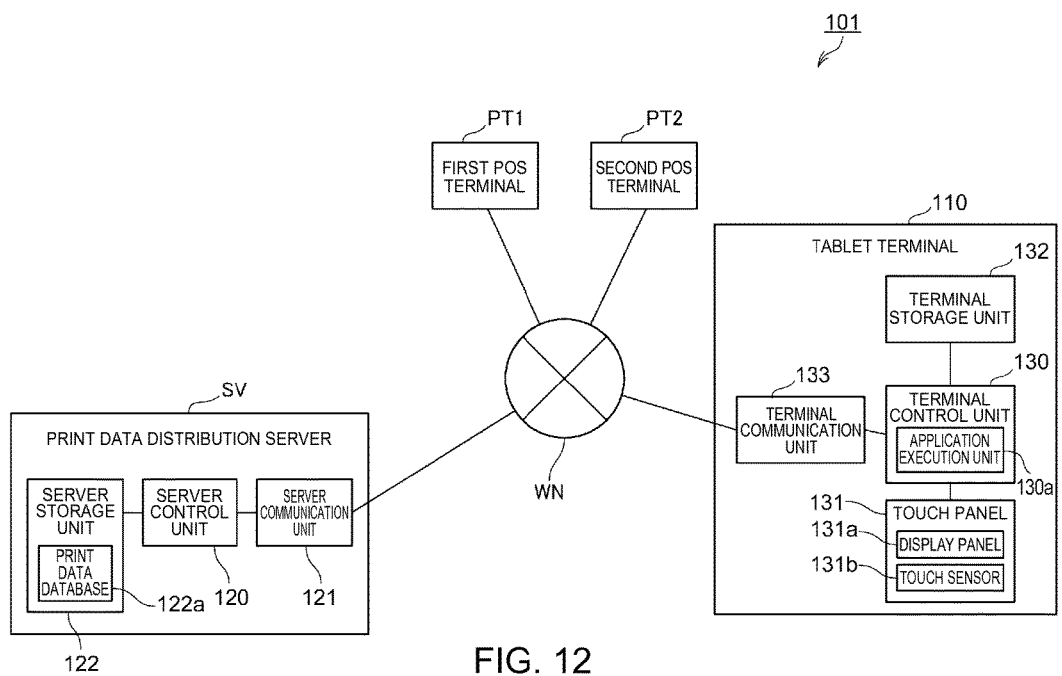
FIG. 12 is a function block diagram of devices in the print data processing system.

FIG. 12 is a block diagram illustrating the functional configuration of the print data distribution server SV, tablet terminal 110, first POS terminal PT1, and second POS terminal PT2.

As shown in FIG. 12, the print data distribution server SV has a server control unit 120, a server communication unit 121, and a server storage unit 122.

The server control unit 120 includes a CPU, ROM, RAM, and other peripheral circuits, and controls the print data distribution server SV.

The server communication unit 121 communicates with other devices connected to the wide-area network WN according to a specific communication protocol as controlled by the server control unit 120.

The server storage unit 122 has nonvolatile memory and stores data. The server storage unit 122 stores a print data database 122a. The stored data is described further below.

The tablet terminal 110 is a tablet-type mobile computing device having a touch panel 131 on the front.

As shown in FIG. 12, the tablet terminal 110 includes a terminal control unit 130, touch panel 131, terminal storage unit 132, and terminal communication unit 133.

The terminal control unit 130 includes a CPU, ROM, RAM, and other peripheral circuits, and controls the tablet terminal 110. One function block of the terminal control unit 130 is an application execution unit 130a. The function of the application execution unit 130a is described further below.

The touch panel 131 includes a display panel 131a and touch sensor 131b. The display panel 131a is a liquid crystal display panel or OLED display panel, for example, and displays images as controlled by the terminal control unit 130. The touch sensor 131b is disposed over the display panel 131a, detects touches by the user (by a waiter in this example), and outputs to the terminal control unit 130.

The terminal storage unit 132 is nonvolatile memory and stores data.

The terminal communication unit 133 communicates with other devices connected to the wide-area network WN according to a specific communication protocol as controlled by the terminal control unit 130.

The first POS terminal PT1 and second POS terminal PT2 are computers with the functions described below. The first POS terminal PT1 and second POS terminal PT2 have a function for communicating with other devices connected to the wide-area network WN. The first POS terminal PT1 and second POS terminal PT2 also have functions for receiving transaction-related input, and generating information related to the transaction based on the input.

Figure 13:
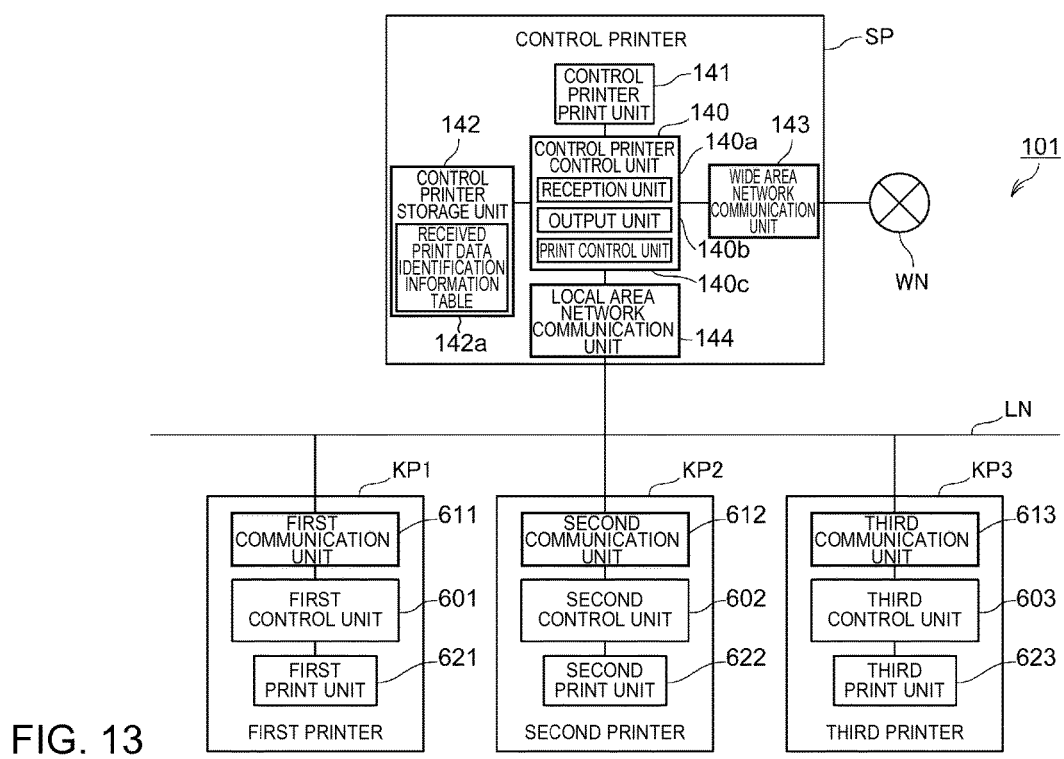
FIG. 13 is a function block diagram of devices in the print data processing system.

FIG. 13 is a block diagram showing the functional configuration of the control printer SP, first printer KP1, second printer KP2, and third printer KP3.

The control printer SP, first printer KP1, second printer KP2, and third printer KP3 are thermal printers.

As shown in FIG. 13, the control printer SP has a control printer control unit 140, control printer print unit 141 (print unit), control printer storage unit 142, wide-area network communication unit 143, and local-area network communication unit 144.

The control printer control unit 140 includes a CPU, ROM, RAM, and other peripheral circuits, and controls the control printer SP. Function blocks of the control printer control unit 140 include a reception process unit JS, output unit 140b, and print control unit 140c. The function blocks are described further below.

The control printer print unit 141 has a storage compartment for storing thermal roll paper, a conveyance unit that conveys the thermal roll paper stored in the storage compartment, a thermal head for forming dots on the thermal roll paper conveyed by the conveyance unit, and a cutting unit that cuts the thermal roll paper.

The control printer storage unit 142 has nonvolatile memory and stores data. The control printer storage unit 142 has a received print data identification information table 142a. The data stored in this table is described further below.

The wide area network communication unit 143 communicates with other devices connected to the wide-area network WN according to a specific communication protocol as controlled by the control printer control unit 140.

The local area network communication unit 144 communicates with the first printer KP1, second printer KP2, and third printer KP3 connected to the local area network LN according to a specific communication protocol as controlled by the control printer control unit 140.

The first printer KP1 includes a first control unit 601, first communication unit 611, and first print unit 621.

The first control unit 601 includes a CPU, ROM, RAM, and other peripheral circuits, and controls the first printer KP1.

The first communication unit 611 communicates with the control printer SP connected to the local area network LN according to a specific communication protocol as controlled by the first control unit 601.

The first print unit 621 has a storage compartment for storing thermal roll paper, a conveyance unit that conveys the thermal roll paper stored in the storage compartment, a thermal head for forming dots on the thermal roll paper conveyed by the conveyance unit, and a cutting unit that cuts the thermal roll paper.

The configuration of the second printer KP2 and third printer KP3 is the same as the first printer KP1. The second printer KP2 includes a second control unit 602, second communication unit 612, and second print unit 622. The third printer KP3 includes a third control unit 603, third communication unit 613, and third print unit 623.

Note that printer KP is used below when not specifically differentiating between the first printer KP1, second printer KP2, and third printer KP3.

The operation of the first POS terminal PT1 and print data distribution server SV when a user (a waiter in this example) inputs transaction information to the first POS terminal PT1 according to the customer's transaction is described next.

When transaction input is detected, the first POS terminal PT1 generates information related to the transaction ("transaction-related information" below) based on the user input. This transaction-related information includes the information printed on the receipt, such as the name, price, and quantity of each of the food and drink items ordered by the customer, the transaction total, the amount of change due, and tax information. In other words, the first POS terminal PT1 generates the transaction-related information each time a transaction is processed and the transaction is finalized.

Next, the first POS terminal PT1 sends the generated transaction-related information and identification information for the control printer SP to the print data distribution server SV (see FIG. 3). The identification information of the control printer SP is information uniquely identifying a particular control printer SP, such as the serial number assigned to the control printer SP when the control printer SP was manufactured. As described above, a corresponding receipt is produced by the control printer SP when information for a particular transaction is input to the first POS terminal PT1.

When transmitting the transaction-related information, the first POS terminal PT1 sends the identification information of the printer for printing a receipt containing the transaction-related information (the control printer SP in this example) together with the transaction-related information. The identification information of the printer used for printing receipts is previously registered. Note also that the information required for the first POS terminal PT1 to transmit to the first print data distribution server SV1, such as the address of the print data distribution server SV, the protocol used for communication, and the format of transmitted data, is previously registered in the first POS terminal PT1. The first POS terminal PT1 establishes a connection according to a specific communication protocol with the print data distribution server SV, and transmits the transaction-related information through this connection.

The server control unit 120 of the print data distribution server SV controls the server communication unit 121 to receive the transaction-related information and the identification information of the control printer SP (see FIG. 12).

Next, the server control unit 120 generates receipt print data (print data) based on the received transaction-related information and control printer SP identification information.

The receipt print data is an XML file instructing printing of a receipt with the transaction-related information. The receipt print data contains information required for printing, such as the identification information of the printer that is to print, identification information identifying the receipt print data, the transaction-related information, and information about where to print the information contained in the transaction-related information, according to the XML protocol. When producing the receipt print data, the server control unit 120 generates information identifying the receipt print data according to a specific rule, and writes the identification information in the receipt print data. Below, the information identifying the receipt print data and the order ticket print data described below is referred to as print data identification information.

After generating the receipt print data, the server control unit 120 stores the generated receipt print data in the print data database 122a of the server storage unit 122.

Figure 14:
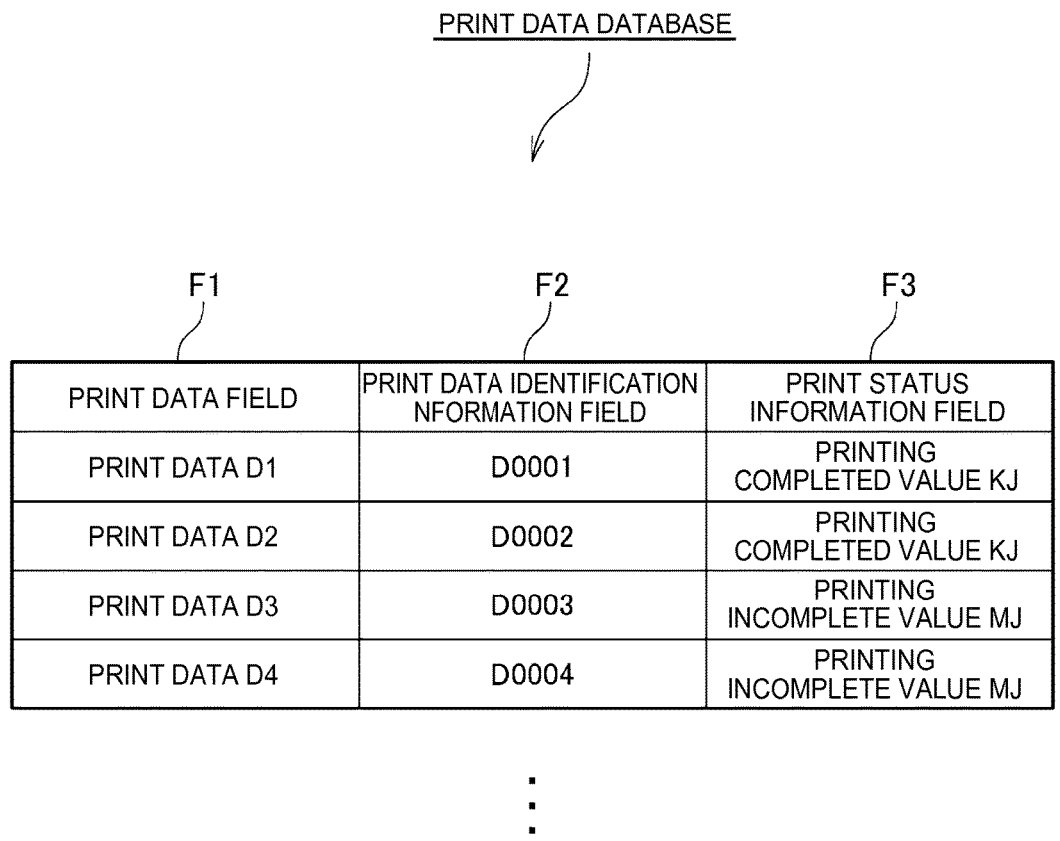
FIG. 14 illustrates the data structure of a print data storage database.

FIG. 14 shows an example of the data structure of the print data database 122a.

As shown in FIG. 14, each record in the print data database 122a has at least the following fields for storing data: a print data field F1, print data identification information field F2, and a print status information field F3.

The print data field F1 is a field for storing the receipt print data and the order ticket print data described further below.

The print data identification information field F2 is a field for storing the print data identification information.

The print status information field F3 is a field for storing the print status. The print status is information indicating whether or not printing based on the corresponding print data is completed, and is set to either a printing completed value KJ indicating the printing has ended (information indicating that printing is completed), or a printing incomplete value MJ indicating that printing is not finished.

After generating the receipt print data, the server control unit 120 creates one record on the print data distribution server SV. The server control unit 120 stores the receipt print data in the print data field F1 of the created record. The server control unit 120 stores the print data identification information in the print data identification information field F2 of the created record. The server control unit 120 also stores the printing incomplete value MJ as the print status information in the print status information field F3 of the created record.

As described below, the receipt print data stored in the print data database 122a is sent to the control printer SP as needed in response to queries by the control printer SP. When print data is sent from the print data distribution server SV to the control printer SP, the receipt print data is print data by a specific corresponding device. When printing based on the receipt print data ends, the control printer SP sends printing completion report data reporting that printing ended with the print data identification information to the print data distribution server SV. When a printing completion report is received, the server control unit 120 changes the print status information stored in the print status information field F3 of the corresponding record from the printing incomplete value MJ to the printing completed value KJ. More specifically, the printing incomplete value MJ is stored to the print status information field F3 until the printing completion report data is received after the receipt print data is generated, and when the printing completion report data is received, the information is changed to the printing completed value KJ. It can therefore be known by referencing the print status information stored in the print status information field F3 of one record whether or not printing based on the corresponding receipt print data is completed.

When transaction-related information is received from the first POS terminal PT1, the print data distribution server SV thus generates and stores receipt print data based on the transaction-related information.

The operation of the second POS terminal PT2 and print data distribution server SV when the user (a waiter in this example) inputs transaction information to the second POS terminal PT2 according to the customer's transaction is the same as described above (see FIG. 12).

More specifically, the second POS terminal PT2 generates transaction-related information according to the transaction, and sends the generated transaction-related information with the identification information of the first printer KP1, which is the printer for printing the receipt, to the print data distribution server SV. The server control unit 120 of the print data distribution server SV generates print data identification information for the receipt print data, and generates the receipt print data based on the generated print data identification information, the received transaction-related information and the identification information of the first printer KP1. The server control unit 120 then generates a record in the print data database 122a, and stores the generated receipt print data, print data identification information, and the printing incomplete value MJ to the corresponding fields in the record.

Note that how the receipt print data stored in the server storage unit 122 is used is described further below.

The operation of the tablet terminal 110 and the print data distribution server SV when the user (a waiter in this example) inputs a customer's order to the tablet terminal 110 is described next.

In this example plural tablet terminals 110 are assigned to plural waiters. A dedicated application AP is preinstalled to the tablet terminal 110. The waiter starts the application AP before taking an order from the customer.

The application execution unit 130a of the terminal control unit 130 of the tablet terminal 110 is a function block embodied by a CPU and other hardware resources reading and running the application AP.

The application execution unit 130a of the terminal control unit 130 of the tablet terminal 110 displays a user interface ("order interface" below) enabling the user to input order information on the display panel 131a. The order interface has an area for selecting the food and drink items ordered by the customer and an area for selecting the quantity of the ordered items, and the user inputs the food and drink items and the quantities ordered by the customer by touching the touch panel 131 (see FIG. 12).

When input related to an order is detected through the order interface, the application execution unit 130a generates information related to the order ("order-related information" below) based on the input. The order-related information includes at least information indicating the names of the food and drink items and the quantity for each of the one or more items ordered by the customer.

Next, the application execution unit 130a sends the generated order-related information and the identification information of the printer to produce an order ticket based on the order-related information to the print data distribution server SV.

Based on the content of the order-related information, the application execution unit 130a determines which of the second printer KP2 and third printer KP3 is to print the order ticket. The application execution unit 130a sends the identification information of the selected printer with the order-related information. Alternatively, a configuration in which the printer used to produce order tickets is preset for each tablet terminal 110, and a configuration in which the printer status is acquired by a specific means and which printer is to produce the order ticket is determined according to the printer status, is also conceivable.

The server control unit 120 of the print data distribution server SV then controls the server communication unit 121 to receive the order-related information and the printer identification information sent by the tablet terminal 110.

Next, the server control unit 120 generates the order ticket print data (print data) based on the order-related information and the printer identification information that was received.

The order ticket print data is an XML file instructing printing of an order ticket printed with the order-related information. The order ticket print data contains the information required for printing, such as the identification information of the printer that is to print the order ticket, the print data identification information of the order ticket print data, the order-related information, and information about where to print the information contained in the order-related information, according to the XML protocol. When generating the order ticket print data, the server control unit 120 generates the print data identification information identifying the data.

Next, the server control unit 120 creates one record in the print data database 122a, and stores the order ticket print data, the print data identification information, and the printing incomplete value MJ in the respective fields.

When order-related information is received from the tablet terminal 110, the print data distribution server SV thus creates and stores order ticket print data based on the order-related information.

Note that print data is used below when not differentiating between the receipt print data and order ticket print data. The print data is an XML file.

The function blocks of the control printer control unit 140 of the control printer SP are described next.

Figure 15:
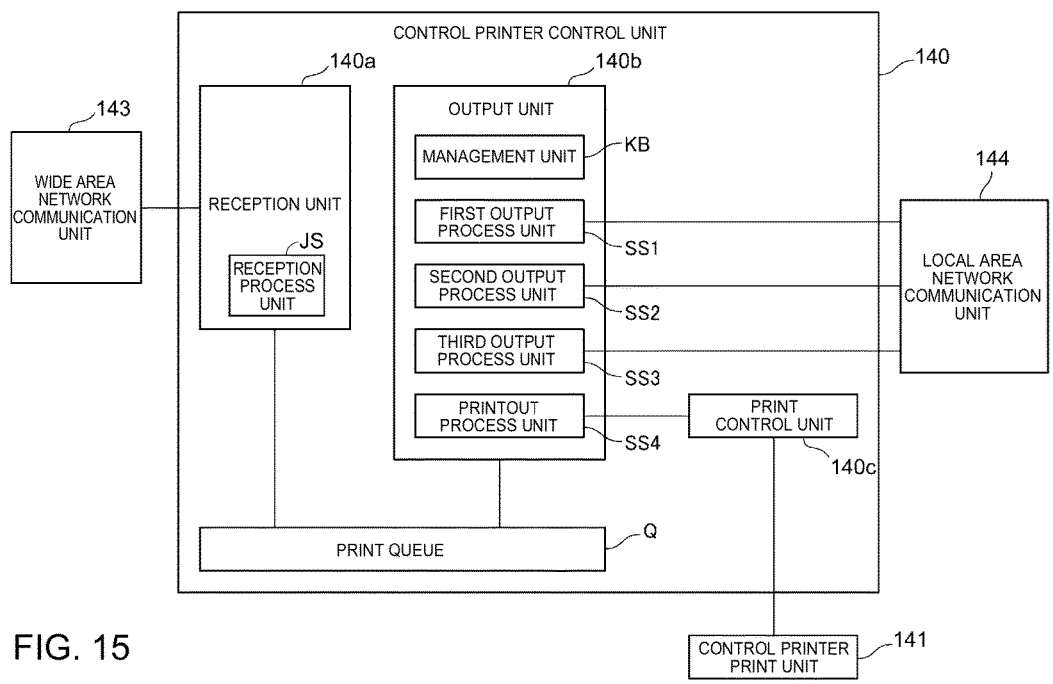
FIG. 15 if a function block diagram of main parts of the control printer.

FIG. 15 illustrates the configuration of the control printer control unit 140 in detail.

As shown in FIG. 15, function blocks of the control printer control unit 140 include a reception unit 140*a*, output unit 140*b*, and print control unit 140*c*.

In this embodiment, a communication process task is started as a task (thread or process) when the control printer SP power turns on or the control printer SP resets. The reception unit 140*a* is a function block that executes a process based on the CPU executing the communication process task, and includes a reception process unit JS.

As shown in FIG. 15, the output unit 140*b* includes a management unit KB, first output process unit SS1, second output process unit SS2, third output process unit SS3, and print output process unit SS4.

The management unit KB is a function block corresponding to the management task that starts when the control printer SP turns on. More specifically, the management unit KB executes a process based on execution of the management task by the CPU. As described further below, when a specific condition is satisfied, the management unit KB starts a first output task, second output task, third output task, or print output task as a task (thread or process).

The first output process unit SS1 is a function block that runs a process based on the CPU executing the first output task. The second output process unit SS2 is a function block that runs a process based on the CPU executing the second output task. The third output process unit SS3 is a function block that runs a process based on the CPU executing the third output task. The printout process unit SS4 is a function block that runs a process based on the CPU executing the print output task. The processes executed by the management unit KB, first output process unit SS1, second output process unit SS2, third output process unit SS3, and print output process unit SS4 are described further below.

Note that when not differentiating therebetween, the first output process unit SS1, second output process unit SS2, and third output process unit SS3 are referred to as transmission process units S. Likewise, the first output process unit SS1, second output process unit SS2, third output process unit SS3, and print output process unit SS4 are referred to as output process units SS.

Function blocks of the reception process unit JS and the output unit 140*b* can write data to the print queue Q (storage area), and can read data from the print queue Q.

The print queue Q is a buffer formed in the working area of a transient storage medium such as RAM.

Print data is input to the print control unit 140*c* under specific conditions as described further below. The print control unit 140*c* converts the input print data (XML file) to control commands in the command language of the control printer print unit 141, and causes the control printer print unit 141 to execute a process based on the control commands.

Configuration of the control printer SP is described next.

As described above, the reception process unit JS is initiated when the control printer SP starts. This embodiment enables accessing the control printer SP and configuring the reception process unit JS through the wide-area network WN from a device with an installed browser.

In this embodiment, web server software (such as Apache HTTP Server) is installed on the control printer SP. The control printer SP can function as a web server that generates and outputs display data according to a specific communication protocol such as HTTP in response to a request from a client.

A browser is also installed on the tablet terminal 110.

An example of accessing the control printer SP from the tablet terminal 110 to configure the reception process unit JS is described below.

The user starts the browser on the tablet terminal 110, and accesses a specific URL managed by the control printer SP. In response to accessing the specific URL, the control printer control unit 140 of the control printer SP generates and outputs a display file for displaying a user interface (referred to below as the configuration interface) for configuring the reception process unit JS. The terminal control unit 130 of the tablet terminal 110 then displays the configuration interface on the display panel 131*a* based on the received display file.

Figure 16:
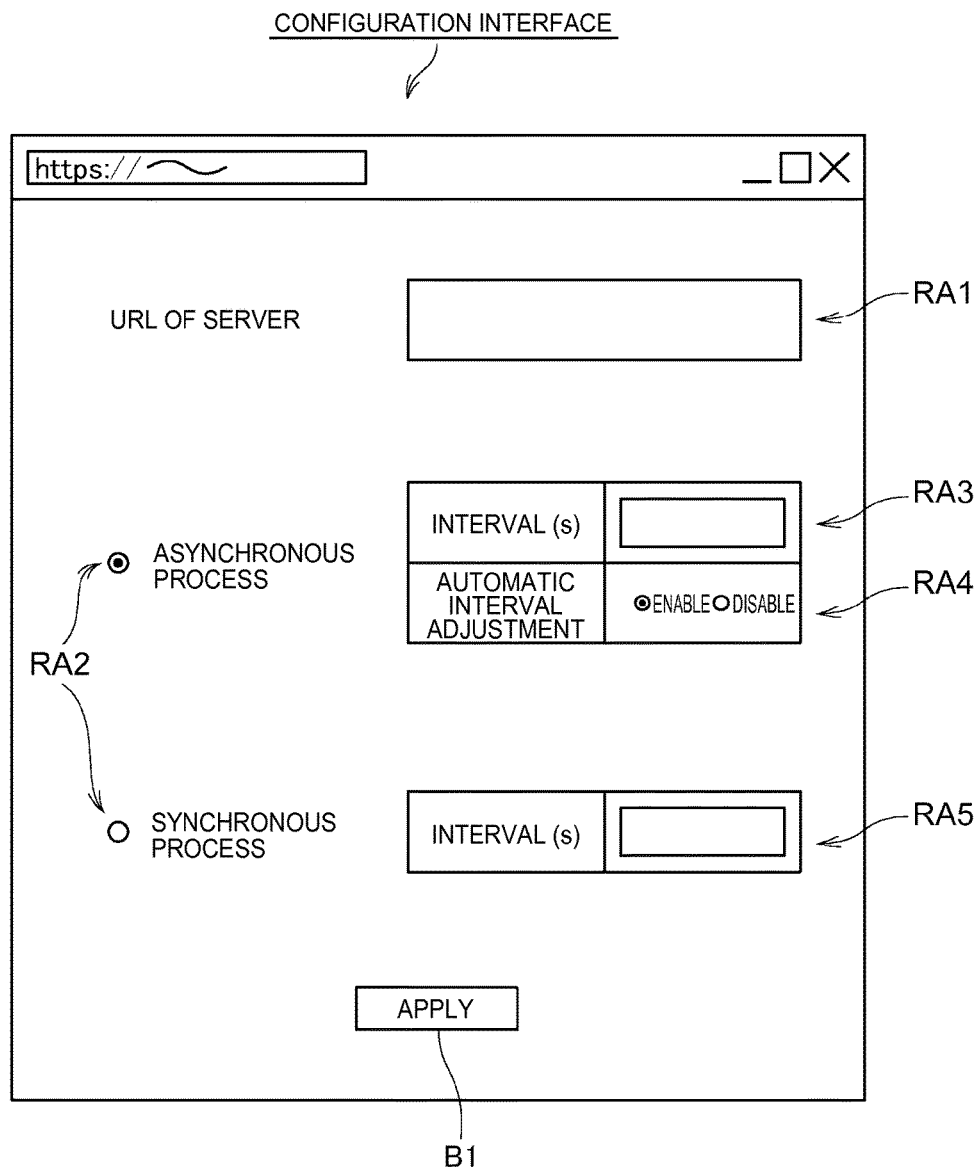
FIG. 16 shows an example of a user interface.

FIG. 16 shows an example of the configuration interface.

As shown in FIG. 16, the configuration interface has a URL input field RA1 for inputting the URL of the print data distribution server SV. As described further below, the reception process unit JS queries the print data distribution server SV for print data, and the URL of the server to query is input to the URL input field RA1.

The configuration interface also has process selection radio buttons RA2. The selection radio buttons RA2 are radio buttons for selecting the process for the reception process unit JS to execute, an asynchronous process (first process) or synchronous process (second process). The asynchronous process and synchronous process are described below. The user selects either the button for asynchronous processing or the button for synchronous processing to select which one process the reception process unit JS is to execute.

The configuration interface also has an asynchronous processing interval input field RA3. The asynchronous processing interval input field RA3 is a field for setting the interval for querying the print data distribution server SV for print data when the reception process unit JS is in the asynchronous process mode. As described further below, the reception process unit JS queries the server for print data at a specific time interval when executing the asynchronous process. The value of this specific time is input to the asynchronous processing interval input field RA3.

The configuration interface also has an automatic interval adjustment field RA4. The automatic interval adjustment field RA4 has radio buttons for enabling or disabling the automatic interval adjustment process described further below.

The configuration interface also has a synchronous processing interval input field RA5. The synchronous processing interval input field RA5 is a field for setting the interval for querying the print data distribution server SV for print data when the reception process unit JS is in the synchronous process mode. As described further below, except during a specific period, the reception process unit JS queries the server for print data at a specific time interval when executing the synchronous process. The value of this specific time is input to the synchronous processing interval input field RA5.

The configuration interface also has an Apply button B1.

When the Apply button B1 is clicked, the input to the configuration interface is confirmed and the input information is sent to the control printer SP.

The control printer control unit 140 of the control printer SP (see FIG. 13) then writes the received information to the registry file or program variables, and reflects the settings based on the input.

Operation of the control printer SP is described next.

Operation of the control printer SP when executing the asynchronous process (first process) is described first. As described above, the reception process unit JS can execute an asynchronous process (first process) and a synchronous process (second process), and the user can use the configuration interface to select which process the reception process unit JS is to execute.

Figure 17:
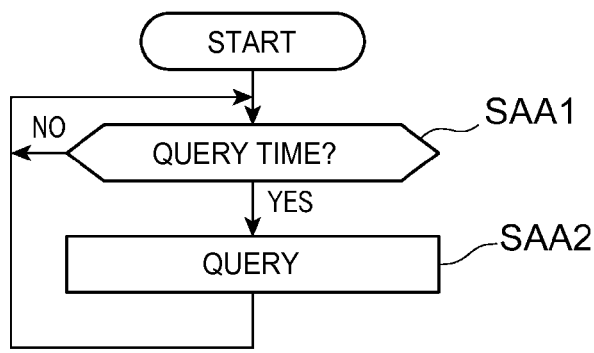
FIG. 17 is a flow chart describing the operation of the control printer when executing an asynchronous process.

FIG. 17 is a flow chart describing the operation of the control printer SP when executing the asynchronous process.

As shown in FIG. 17, when executing the asynchronous process, the reception process unit JS monitors whether it is time to query the print data distribution server SV for print data (step SAA1). In the asynchronous process, the reception process unit JS queries the print data distribution server SV for print data regularly at the interval input to the asynchronous processing interval input field RA3 of the configuration interface or the interval adjusted by the automatic interval adjustment process described further below. The interval for querying the server for print data in the asynchronous process is referred to as the first interval. In step SAA1, the reception process unit JS checks whether the time corresponding to the first interval has past since the last query, and if the time has past, determines it is time to query the server for print data.

If it is time to query the server for print data (step SAA1 returns YES), the reception process unit JS generates a print data query, and controls the wide-area network communication unit 143 to send the query data to the print data distribution server SV (step SAA2).

As described above, the URL (the URL of the print data distribution server SV) input to the URL input field RA1 is stored in a registry (configuration) file, and the reception process unit JS manages the URL. In step SAA2, the reception process unit JS accesses the print data distribution server SV based on the managed URL, opens a connection according to a specific communication protocol, and sends the data through the connection.

After querying for print data, the reception process unit JS returns to step SAA1, and monitors whether it is time to query the server for print data.

The reception process unit JS can thus query the print data distribution server SV for print data at the first interval irrespective of the status of processing based on the received print data. As a result, the control printer SP can query the server for print data irrespective of the status of processing based on the received print data. The delay until the control printer SP receives the print data after the print data distribution device sends the print data can therefore be shortened.

Figure 18:
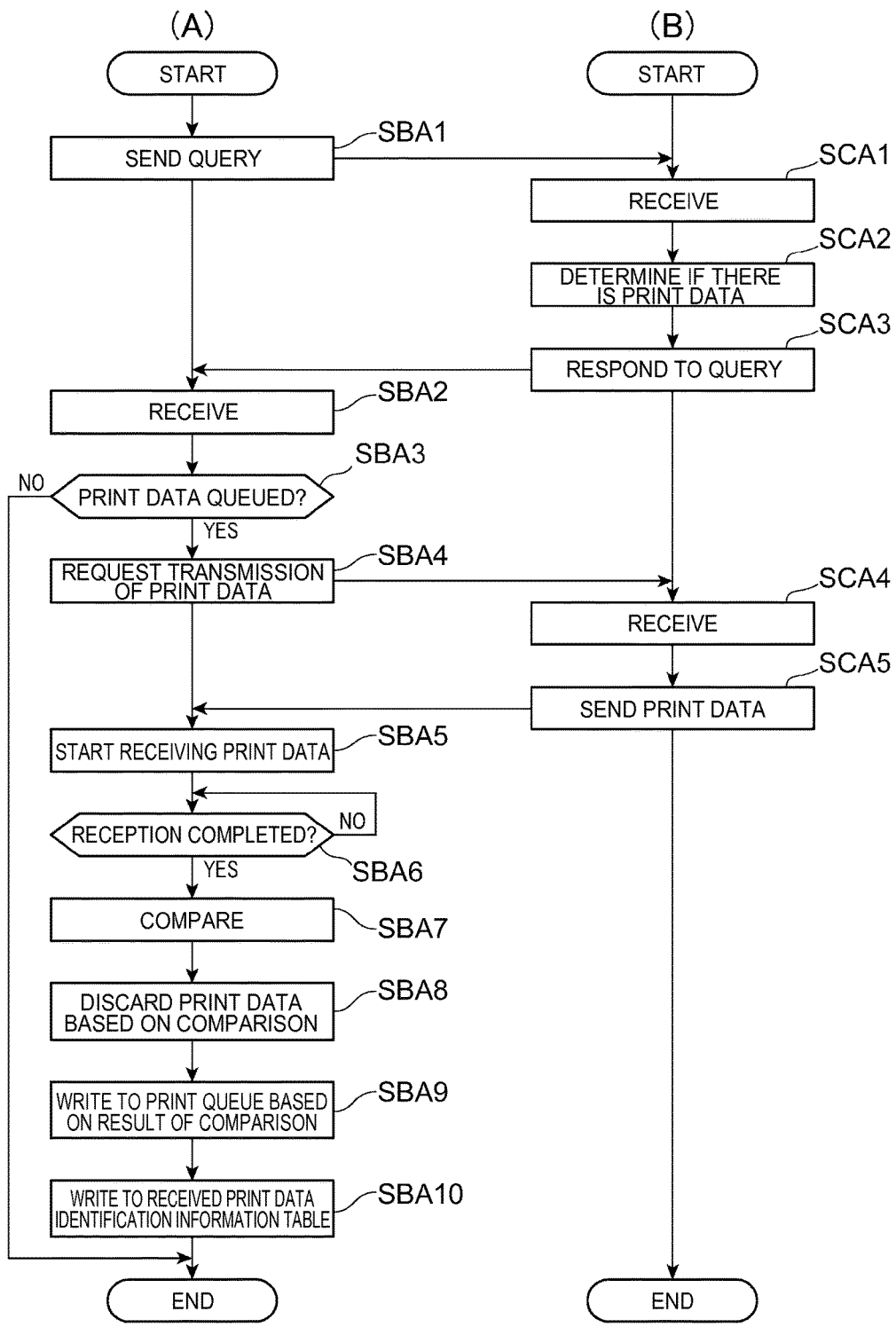
FIG. 18 is a flow chart in which (A) describes the operation of the control printer and (B) describes the operation of the print data distribution server when executing an asynchronous process.

FIG. 18 is a flow chart describing the operation of the control printer SP and the print data distribution server SV after the reception process unit JS queries the server for print data when executing the asynchronous process. FIG. 18 (A) shows the operation of the control printer SP, and FIG. 18 (B) shows the operation of the print data distribution server SV.

As shown in (A) of FIG. 18, reception process unit JS of the control printer control unit 140 of the control printer SP generates data to query the server for print data, and controls the wide-area network communication unit 143 to send the query data to the print data distribution server SV (step SBA1). As described above, the control printer control unit 140 opens a connection with the print data distribution server SV according to a specific communication protocol, and sends the data through the connection.

As shown in (B) of FIG. 18, the server control unit 120 of the print data distribution server SV controls the server communication unit 121 to receive the data (step SCA1).

Next, the server control unit 120 references the print data database 122a and determines if there is any print data that can be sent (step SCA2).

More specifically, as described above, each record in the print data database 122a has a print status information field F3. In step SCA2, the server control unit 120 determines there is print data that can be sent if there is even one record with the printing incomplete value MJ stored in the print status information field F3. In step SCA2, the server control unit 120 determines there is no print data that can be sent if such a record is not found.

Next, based on the result of this decision, the server control unit 120 controls the server communication unit 121 to send data including information about whether or not there is print data that can be sent through the connection established in step SBA1 (step SCA3).

As shown in (A) of FIG. 18, the reception process unit JS of the control printer SP controls the wide-area network communication unit 143 to receive the data sent by the print data distribution server SV (step SBA2).

Next, based on the received data, the reception process unit JS determines whether or not there is print data that can be sent to the print data distribution server SV (step SBA3).

If there is no print data that can be sent (meaning that the received data includes information that there is no print data that can be sent) (step SBA3 returns NO), the reception process unit JS ends the process.

If there is print data that can be sent (meaning that the received data includes information that there is print data that can be sent) (step SBA3 returns YES), the reception process unit JS uses the opened connection to send data requesting transmission of the print data (step SBA4).

As shown in (B) of FIG. 18, the server control unit 120 of the print data distribution server SV controls the server communication unit 121 to receive the data the control printer SP sent (step SCA4).

Next, the server control unit 120 uses the opened connection to send the print data identified by the printing incomplete value MJ in the print data database 122a (meaning the print data that can be sent) (step SCA5). The print data identified by the printing incomplete value MJ is print data for which the printing completion report data reporting that printing based on the print data was completed has not been received since the print data was generated. If there are plural print data records containing the printing incomplete value MJ, the server control unit 120 sequentially sends the print data of the plural records.

As shown in (A) of FIG. 18, in response to transmission of print data by the print data distribution server SV, the reception process unit JS of the control printer SP starts receiving the print data (step SBA5). The reception process unit JS sequentially stores the received data to the receive buffer created in RAM or other working memory, for example, while receiving the print data.

After starting to receive the print data, the reception process unit JS monitors whether or not print data reception is completed (step SBA6). If print data for plural jobs is received, in step SBA7 the reception process unit JS monitors whether or not receiving the print data for all jobs has been completed in step SBA6.

When reception of the print data is completed (step SBA6 returns YES), the reception process unit JS executes a comparison process (step SBA7). This comparison process is described below. The reception process unit JS references the content of the print data stored in the receive buffer, and gets the print data identification information written in the print data. When print data for plural jobs is received, the reception process unit JS gets the print data identification information of the print data for each of the jobs.

Next, the reception process unit JS references the received print data identification information table 142a stored in the control printer storage unit 142 (see FIG. 13). The received print data identification information table 142a is a table that cumulatively stores the print data identification information of print data that has been completely received and written to the print queue Q. As described below, the reception process unit JS writes the print data identification information of the stored print data to the received print data identification information table 142a when the print data is stored in the print queue Q.

Next, the reception process unit JS determines whether print data identification information of the same value as the acquired print data identification information was written to the received print data identification information table 142a. If print data identification information of the same value as the acquired print data identification information was written to the received print data identification information table 142a, the same data was already received and stored in the print queue Q.

If print data for plural jobs is received, the reception process unit JS compares the print data identification information of the print data for each job with the print data identification information written to the received print data identification information table 142a.

In the comparison process of step SBA7, the reception process unit JS determines whether print data newly received from the print data distribution server SV is the same as print data that was previously received from the server. Reasons for the same data being received from the print data distribution server SV plural times are described below.

As shown in FIG. 12, in the print data database 122a stored by the print data distribution server SV, the generated print data is stored relationally with print status information (printing incomplete value MJ or printing completed value KJ) indicating whether or not printing based on the print data is completed. As described in step SCA5 of FIG. 18, when the print data distribution server SV is queried for print data, the server control unit 120 sends the print data stored with the printing incomplete value MJ in the print data database 122a. Thus, if the print data distribution server SV is queried for print data by the control printer SP after print data for one job has been transmitted but before the printing incomplete value MJ related to that print data has been changed to the printing completed value KJ, the print data distribution server SV sends that print data. For this reason, the control printer SP may receive the same data plural times from the print data distribution server SV.

Note that information indicating whether transmission was completed may be stored relationally to the print data in the print data database 122a, in which case the print data distribution server SV can select the print data to transmit based on this information. Compared with this embodiment of the invention, however, this configuration increases the amount of data stored in the print data database 122a, and increases the processes that must be executed by the print data distribution server SV. More specifically, this information is unnecessary information in the synchronous process (second process) described below. As a result, as will become apparent below, when the process executed by the control printer SP can be switched between an asynchronous process and a synchronous process, increasing the amount of data that is stored can be suppressed and the processor load can be reduced by not storing this information in the print data database 122a.

Next, if the print data received for one or plural jobs includes print data with print data identification information of the same value as the value of the print data identification information written to the received print data identification information table 142a, the reception process unit JS discards that print data (step SBA8). Discarding the print data means not writing the print data to the print queue Q. As a result of step SBA8, if the control printer SP receives the same print data plural times, print data other than the print data received first is not written to the print queue Q, and therefore is not processed.

Next, if the print data received for one or plural jobs includes print data having print data identification information with a value that does not match the values of the print data identification information written to the received print data identification information table 142a, the reception process unit JS executes the following process. More specifically, the reception process unit JS writes that print data to the print queue Q (step SBA9).

Next, if there is print data in the print queue Q, the reception process unit JS writes the print data identification information for that print data to the received print data identification information table 142a (step SBA10). If print data for plural jobs is in the print queue Q, the reception process unit JS writes the print data identification information for the plural print data records to the received print data identification information table 142a.

The automatic interval adjustment process executed by the reception process unit JS during the asynchronous process when the automatic interval adjustment process is enabled through the configuration interface is described next.

As described above, when executing the asynchronous process, the reception process unit JS queries the print data distribution server SV for print data at a regular interval regardless of processes based on print data that has been received. This automatic interval adjustment process is a process that automatically adjusts the print data query interval.

More specifically, when print data is frequently discarded in step SBA8, the reception process unit JS increases the query interval. For example, when the print data is discarded more than a specific threshold number of times in a specific unit time, the reception process unit JS increases the set interval X seconds. When the print data is no longer discarded more than the specific threshold number of times in a specific unit time, the reception process unit JS shortens the query interval X seconds.

The effect of this process is described below. Specifically, that the print data is frequently discarded means that the control printer SP queries for print data at a faster pace than the received print data is processed. By adjusting the query interval as described above, the gap between the pace at which received print data is processed and the pace at which a print data query is sent can be reduced, and the frequency of discarding the received print data can be reduced.

The reception process unit JS also changes the print data query interval according to the status of the print queue Q in the automatic interval adjustment process. More specifically, the reception process unit JS increases the query interval when the capacity for writing new print data to the print queue Q becomes small. For example, the reception process unit JS may monitor the capacity available for writing new print data to the print queue Q, and increase the set interval by Y seconds when the available capacity goes below a specific threshold. When this capacity problem is resolved, the reception process unit JS shortens the query interval by Y seconds.

The effect of this process is described below. Specifically, that the capacity for writing new data to the print queue Q goes below the set threshold means that the control printer SP queries for print data at a faster pace than the received print data is processed. By adjusting the query interval as described above, the gap between the pace at which received print data is processed and the pace at which print data queries are sent can be reduced, and the frequency of being unable to write print data to the print queue Q can be reduced.

Figure 19:
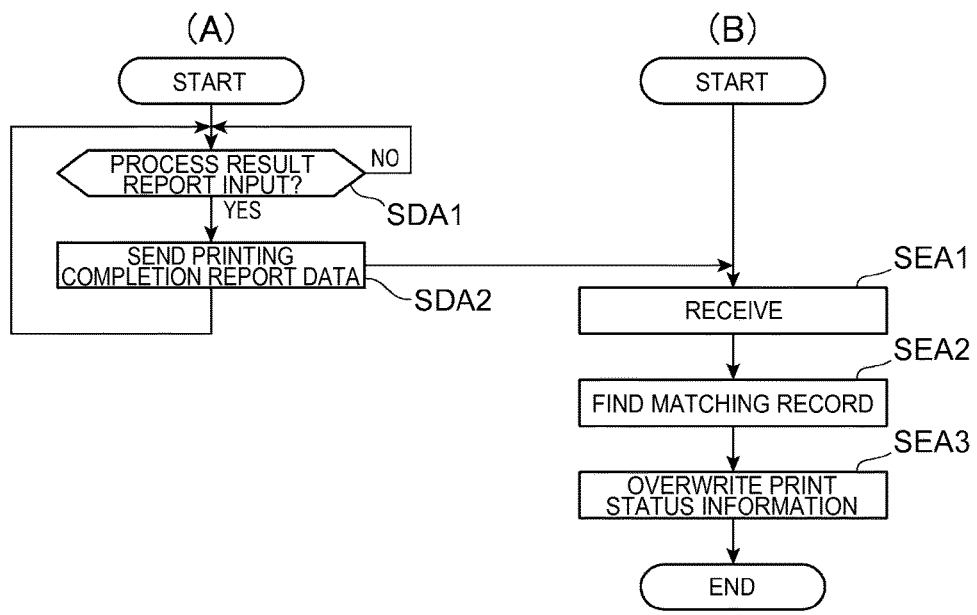
FIG. 19 is a flow chart in which (A) describes the operation of the control printer and (B) describes the operation of the print data distribution server when executing an asynchronous process.

FIG. 19 is a flow chart describing a process the reception process unit JS executes parallel to the processes shown in FIG. 17 and FIG. 18 while executing the asynchronous process. (A) of FIG. 19 shows the operation of the control printer SP, and (B) of FIG. 19 shows the operation of the print data distribution server SV.

As shown in (A) of FIG. 19, the reception process unit JS of the control printer SP monitors whether or not the process result report was received from the management unit KB (step SDA1). As described below, the management unit KB, when printing based on the print data written to the print queue Q is completed, outputs a process result report containing the print data identification information of the print data to the reception process unit JS.

When a process result report is input (step SDA1 returns YES), the reception process unit JS uses the opened connection to send the printing completion report data (step SDA2), and then returns to step SDA1. The printing completion report data is data including the print data identification information contained in the process result report and indicating that printing based on the print data corresponding to the identification information completed.

As shown in (B) of FIG. 19, the server control unit 120 of the print data distribution server SV receives the printing completion report data (step SEA1).

Next, the server control unit 120 references the print data database 122a to find a record storing the print data identification information contained in the received printing completion report data in the print data identification information field F2 (step SEA2).

Next, the server control unit 120 changes the printing incomplete value MJ stored in the print status information field F3 of the found record to the printing completed value KJ (step SEA3). As a result of step SEA3, the corresponding print data for which the print status information was overwritten will not be sent to the control printer SP when queried.

Figure 20:
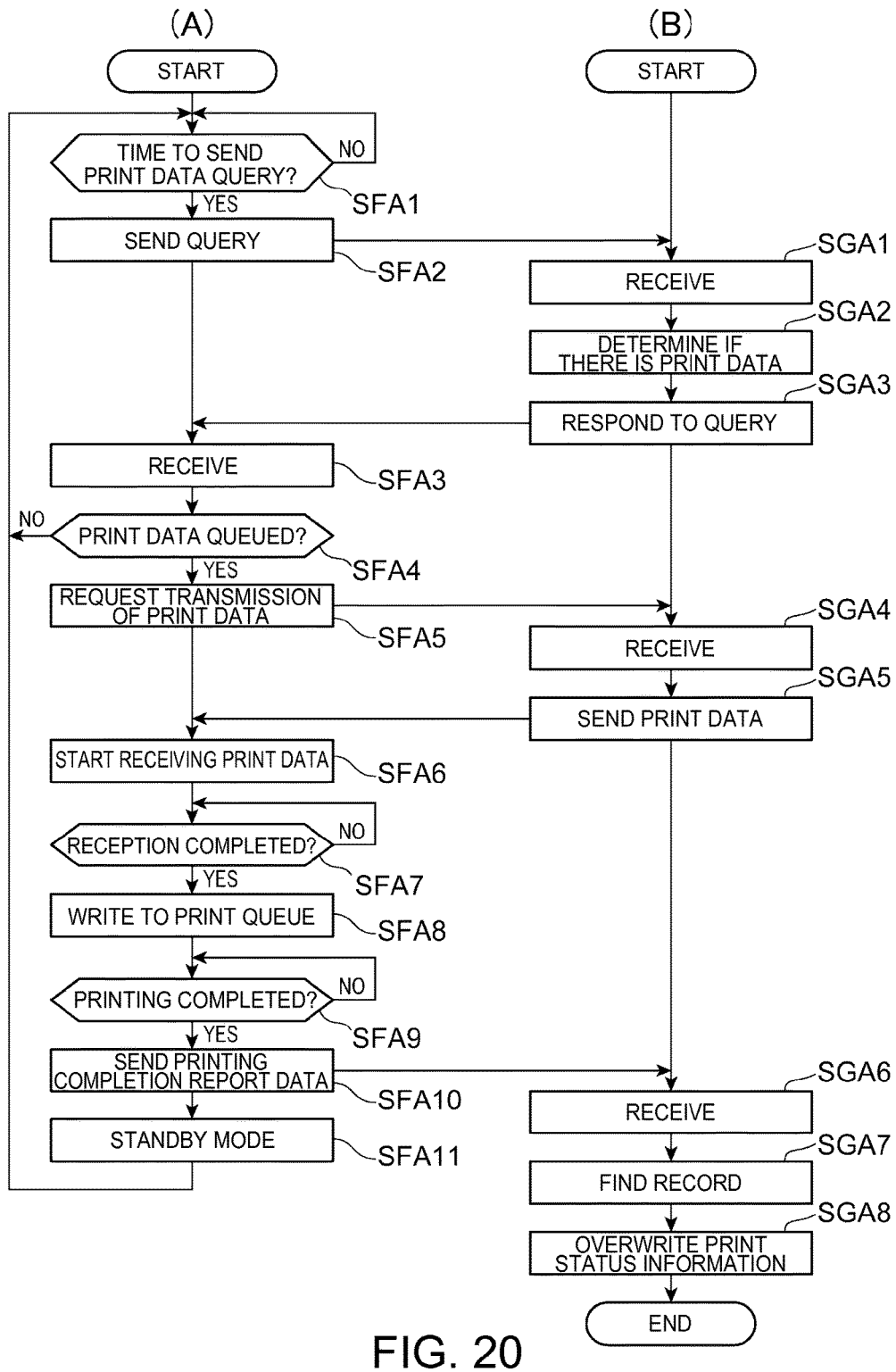
FIG. 20 is a flow chart in which (A) describes the operation of the control printer and (B) describes the operation of the print data distribution server when executing an asynchronous process.

FIG. 20 is a flow chart describing the operation of the control printer SP when executing the synchronous process (second process).

As described above, the user uses the configuration interface to select the synchronous process as the process to be executed by the control printer SP.

FIG. 20 is a flow chart describing the operation of the control printer SP and the print data distribution server SV when executing the synchronous process. FIG. 20 (A) shows the operation of the control printer SP, and FIG. 20 (B) shows the operation of the print data distribution server SV.

As shown in FIG. 20 (A), reception process unit JS of the control printer control unit 140 of the control printer SP monitors whether it is time to query the print data distribution server SV for print data (step SFA1). generates data to query the server for print data, and controls the wide-area network communication unit 143 to send the query data to the print data distribution server SV (step SBA1). As described above, the control printer control unit 140 opens a connection with the print data distribution server SV according to a specific communication protocol, and sends the data through the connection.

Except during the print data processing period, the reception process unit JS queries the print data distribution server SV for print data when executing the synchronous process at the interval input to the synchronous processing interval input field RA5 of the configuration interface. In step SFA1, the reception process unit JS checks whether the time corresponding to the set interval has past since the last query, and if the time has past, determines that it is time to query the server for print data.

If it is time to query the server for print data (step SFA1 returns YES), the reception process unit JS generates a print data query, and controls the wide-area network communication unit 143 to send the query data to the print data distribution server SV (step SFA2).

As shown in FIG. 20 (B), the server control unit 120 of the print data distribution server SV controls the server communication unit 121 to receive the data (step SGA1).

Next, the server control unit 120 references the print data database 122a and determines whether there is any print data that can be sent (step SGA2). As described above, print data that can be sent is print data in the print data database 122a for which the print status information is set to the printing incomplete value MJ. As will become apparent below, when running the synchronous process, the print status information of print data that has not been sent from the print data distribution server SV to the control printer SP is set to the printing incomplete value MJ.

Next, based on the result of this decision, the server control unit 120 controls the server communication unit 121 to send data including information about whether or not there is print data that can be sent through the established connection (step SGA3).

As shown in FIG. 20 (A), the reception process unit JS of the control printer SP controls the wide-area network communication unit 143 to receive the data sent by the print data distribution server SV (step SFA2).

Next, if the received data includes information indicating that there is no print data that can be sent (step SFA4 returns NO), the reception process unit JS returns to step SFA1.

If the received data includes information indicating that there is print data that can be sent (step SFA4 returns YES), the reception process unit JS uses the opened connection to send data requesting transmission of the print data (step SFA5).

As shown in FIG. 20 (B), the server control unit 120 of the print data distribution server SV then receives the data (step SGA4).

Next, the server control unit 120 uses the opened connection to send the print data identified by the printing incomplete value MJ in the print data database 122a (meaning the print data that can be sent) (step SGA5). If there are plural print data records containing the printing incomplete value MJ, the server control unit 120 sequentially sends the print data of the plural records.

As shown in FIG. 20 (A), in response to transmission of print data by the print data distribution server SV, the reception process unit JS of the control printer SP starts receiving the print data (step SFA6). The reception process unit JS sequentially stores the received data to the receive buffer while receiving the print data.

After starting to receive the print data, the reception process unit JS monitors whether or not print data reception is completed (step SFA7). If print data for plural jobs is received, in step SFA7 the reception process unit JS monitors whether or not receiving the print data for all jobs has been completed.

When reception of the print data is completed (step SFA7 returns YES), the reception process unit JS writes the received print data (the print data for plural jobs when plural jobs are received) to the print queue Q (step SFA8).

As will become apparent below, because the same print data will not be received multiple times in the synchronous process, there is no need for the comparison process executes in step SBA7 in the asynchronous process.

Next, the reception process unit JS monitors whether a process result report indicating the printing based on the print data written to the print queue Q in step SFA8 was completed (step SFA9).

A process result report indicating that the printing based on the print data written to the print queue Q in was completed is a process result report containing the print data identification information of the print data written to the print queue Q. If print data for plural jobs is written to the print queue Q, in step SFA9 the reception process unit JS checks whether or not process result reports for all print jobs (print data) were input.

When a process result report is input, the reception process unit JS uses the opened connection to send printing completion report data (step SFA10). As described above, the printing completion report data is data including the print data identification information contained in the process result report and indicating that printing based on the print data corresponding to the identification information completed. If print data for plural jobs is written to the print queue Q, in step SFA10 the reception process unit JS sends printing completion report data including the print data identification information of the print data for all jobs.

Next, the reception process unit JS waits for a specific time (step SFA11), and then returns to step SFA1 and starts querying for print data. The specific time the reception process unit JS waits is the time required for the print data distribution server SV to overwrite the print status information in step SGA8 described below.

In the synchronous process, the control printer SP does not query the server for print data during the print data processing period from when print data is received in response to a print data query until printing based on the received print data is completed. Thus, the time from when the print data distribution server SV becomes able to transmit print data until the control printer SP receives the print data may increase compared with the asynchronous process, but there is no need for the comparison process described above or to discard print data, and the print data can be received and printed sequentially.

As shown in FIG. 20 (B), the server control unit 120 of the print data distribution server SV receives the printing completion report data (step SGA6).

Next, the server control unit 120 references the print data database 122*a* to find the record storing the print data identification information contained in the received printing completion report data in the print data identification information field F2 (step SGA7). If printing completion report data for plural print jobs is received, the server control unit 120 finds the plural matching records.

Next, the server control unit 120 changes the printing incomplete value MJ stored in the print status information field F3 of the one or plural records that are found to the printing completed value KJ (step SGA8). As a result of step SGA8, the corresponding print data for which the print status information was overwritten will not be sent to the control printer SP when queried.

Processing print data received by the control printer SP and stored in the print queue Q is described next.

Processing print data stored in the print queue Q is the same in the asynchronous process and the synchronous process. More specifically, the print data is processed by the method described below whether the asynchronous process or the synchronous process is executed.

As described above, when not differentiating between the first output process unit SS1, the second output process unit SS2, the and third output process unit SS3, transmission process unit S is used. When not differentiating between the first output process unit SS1, the second output process unit SS2, the third output process unit SS3, the and printout process unit SS4, output process unit SS is used.

As described above, when a specific condition is met, the management unit KB initiates the first output process unit SS1, second output process unit SS2, third output process unit SS3, or printout process unit SS4. The process executed by the transmission process units S (first output process unit SS1, second output process unit SS2, and third output process unit SS3), and the process executed by the printout process unit SS4, are different.

The process of the first output process unit SS1 is described next with reference to FIG. 21, and then the process of the printout process unit SS4 is described with reference to FIG. 22.

Figure 21:
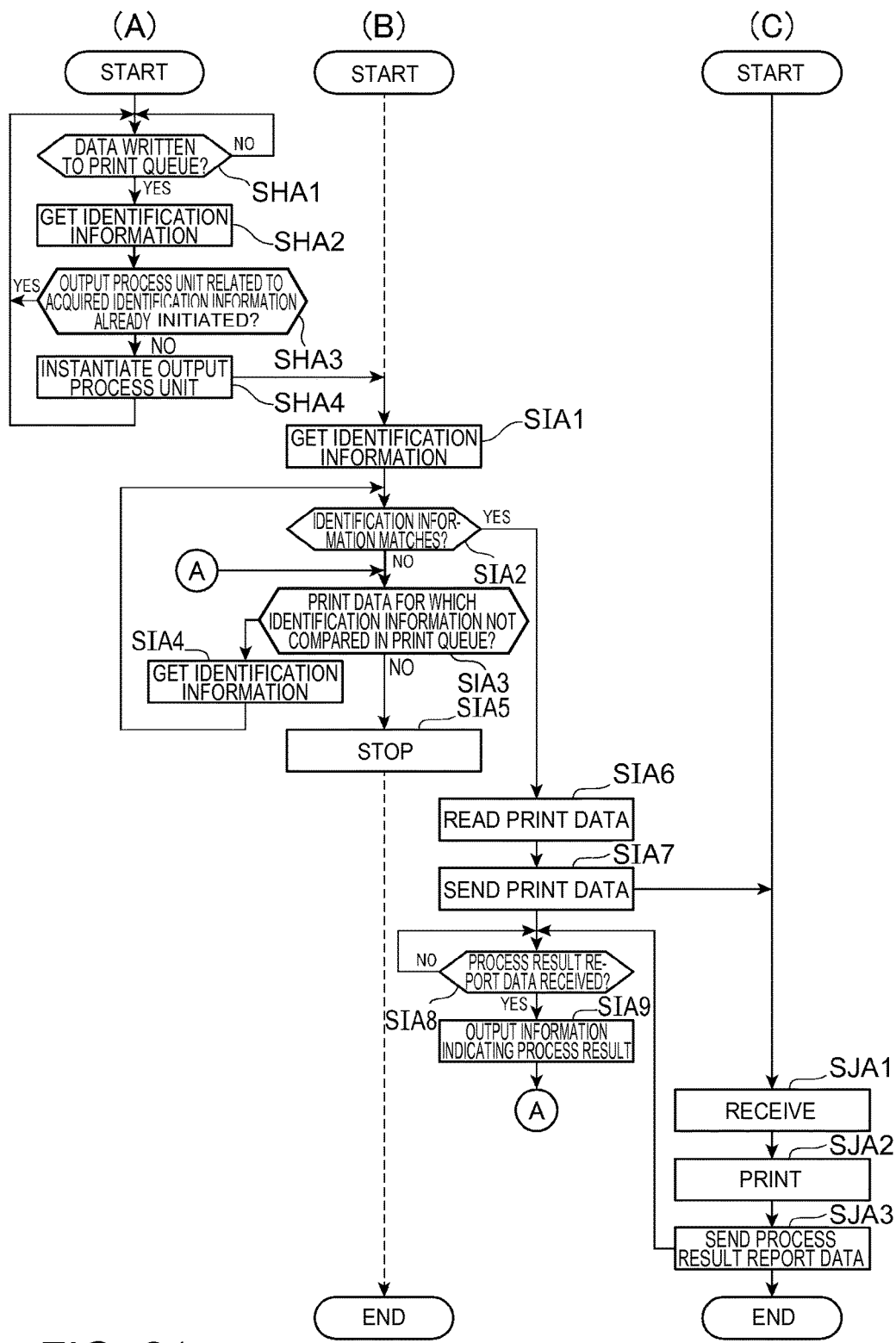
FIG. 21 is a flow chart in which (A) and (B) describe the operation of the control printer, and (C) describes the operation of the first printer.

(A) in FIG. 21 is a flow chart describing the operation of the management unit KB, (B) in FIG. 21 is a flow chart describing the operation of the first output process unit SS1, and (C) in FIG. 21 is a flow chart describing the operation of the first printer KP1.

As shown in (A) in FIG. 21, the management unit KB monitors whether print data was written to the print queue Q (step SHA1). That print data was written means that after writing to the print queue Q started, writing that set of print data is completed, and if print data for plural jobs is written, means that writing the print data for the plural jobs is completed.

When print data is written to the print queue Q (step SHA1 returns YES), the management unit KB references the content of the print data, and gets the printer identification information contained in the print data (step SHA2). If print data for plural jobs is written, the management unit KB gets the printer identification information contained in the print data of the plural jobs.

Next, the management unit KB determines whether the output process unit SS corresponding to the acquired printer identification information was initiated (transmission process unit S or printout process unit SS4) (step SHA3). If identification information is acquired for plural printers in step SHA2, the management unit KB determines whether an output process unit SS was initiated for the identification information of each of the printers.

The output process unit SS corresponding to the identification information of the first printer KP1 is the first output process unit SS1 (see FIG. 15). The output process unit SS corresponding to the identification information of the second printer KP2 is the second output process unit SS2. The output process unit SS corresponding to the identification information of the third printer KP3 is the third output process unit SS3. The output process unit SS corresponding to the identification information of the control printer SP is the printout process unit SS4.

When the output process unit SS corresponding to the printer identification information acquired in step SHA2 is initiated (step SHA3 returns YES), the management unit KB returns to step SHA1. In this event, as will be understood below, the print data written to the print queue Q is processed by an output process unit SS that was already initiated.

If an output process unit SS has not been initiated for any printer identified by the printer identification information acquired in step SHA2 (step SHA3 returns NO), the management unit KB initiates the output process unit SS corresponding to the identification information of the uninitiated output process unit SS (step SHA4). For example, if the acquired printer identification information is the identification information of the first printer KP1, and the first output process unit SS1 has not been initiated, the management unit KB initiates the first output process unit SS1 by starting the first output task.

The process executed by the first output process unit SS1 is described below with reference to FIG. 21 based on the management unit KB initiating the first output process unit SS1 in step SHA4. Detailed description of the processes executed by the second output process unit SS2 and the third output process unit SS3 is omitted below as these output process units SS execute the same process after initiation.

As shown in (B) of FIG. 21, the first output process unit SS1 references the content of the unread print data stored in the print queue Q that was written earliest to the print queue Q, and acquires the printer identification information contained in that print data (step SIA1).

Next, the first output process unit SS1 determines whether the acquired printer identification information and the identification information of the first printer KP1 (corresponding identification information) match (step SIA2). Note that the second output process unit SS2 determines whether the acquired printer identification information matches the identification information of the second printer KP2. In the corresponding process in step SIA2, the third output process unit SS3 determines whether the acquired printer identification information matches the identification information of the third printer KP3.

If the identification information does not match (step SIA2 returns NO), the first output process unit SS1 determines whether there is any print data in the print queue Q that is unread and has not been processed to acquire the identification information in step SIA1 and for comparison in step SIA2 (step SIA3).

If there is such print data (step SIA3 returns YES), the first output process unit SS1 acquires from the unread print data the identification information in the print data stored next after the last print data from which the identification information was acquired and compared (step SIA4), and then returns to step SIA2.

If there is no such print data (step SIA3 returns NO), the first output process unit SS1 ends processing by stopping the first output task (step SIA5).

If in step SIA2 the acquired printer identification information and the identification information of the first printer KP1 match (step SIA2 returns YES), the first output process unit SS1 reads the print data from which the printer identification information was acquired from the print queue Q (step SIA6) (see FIG. 13).

Next, the first output process unit SS1 controls the local-area network communication unit 144 and sends (outputs) the read print data to the first printer KP1 (step SIA7) (see FIG. 13). The first output process unit SS1 previously acquires and manages the information required to send data to the first printer KP1, such as the IP address or MAC address of the first printer KP1.

As shown in (C) in FIG. 21, the first control unit 601 of the first printer KP1 controls the first communication unit 611 to receive the print data (step SJA1).

Next, the first control unit 601 converts the received print data to control commands in the command language of the first print unit 621, and based on these control commands, controls the first print unit 621 to execute a process based on the control commands (step SJA2). Because the print data is receipt print data, a receipt is produced by the first printer KP1 as the result of step SJA2.

Next, the first control unit 601 generates data indicating that the result of processing the print data (referred to as "process result report data" below), and controls the first communication unit 611 to transmit to the control printer SP (step SJA3).

As shown in (B) of FIG. 21, the first output process unit SS1 of the control printer SP monitors whether or not the process result report data is received after sending the print data (step SIA8).

If the process result report data is received (step SIA8 returns YES), the first output process unit SS1 outputs information indicating the process result by means of an interrupt, for example, to the management unit KB (step SIA9). The print data identification information of the print data that was processed is included in the information indicating the process result. How the information indicating the process result is used by the management unit KB is described further below.

Next, the first output process unit SS1 goes to step SIA3.

As described above, the first output process unit SS1 is a function block for sending print data to the first printer KP1 (see FIGS. 4 and 5). Operation of the first output process unit SS1 is triggered by storing print data containing the identification information of the first printer KP1 in the print queue Q. After initiation, the first output process unit SS1 determines, in the order in which the print data is stored in the print queue Q (in other words, the order in which the print data is received), whether or not the identification information contained in unread print data stored in the print queue Q matches the identification information of the first printer KP1. If the identification information matches, the first output process unit SS1 reads and sends the print data with matching identification information to the first printer KP1.

Thus comprised, the first output process unit SS1 can transmit print data to be processed by the first printer KP1 in the order the print data is stored to the print queue Q, that is, in the order the print data is received. For example, if plural process units with the ability to transmit data to the first printer KP1 are initiated, and the plural process units are constructed to independently read and transmit the print data, the print data may not be transmitted in the order the print data was received. However, the embodiment thus described can prevent this from happening.

The first output process unit SS1 stops when there is no unread print data to be processed by the first printer KP1 in the print queue Q. More specifically, the first output process unit SS1 stops when there is no need for processing by the first output process unit SS1. As a result, the first output process unit SS1 remaining initiated when there is no need for it can be suppressed, and the CPU and other hardware resources and other resources can be used effectively.

The foregoing also applies to the second output process unit SS2 and the third output process unit SS3.

Operation of the printout process unit SS4 and the print control unit 140c after the management unit KB initiates the printout process unit SS4 is described next.

Figure 22:
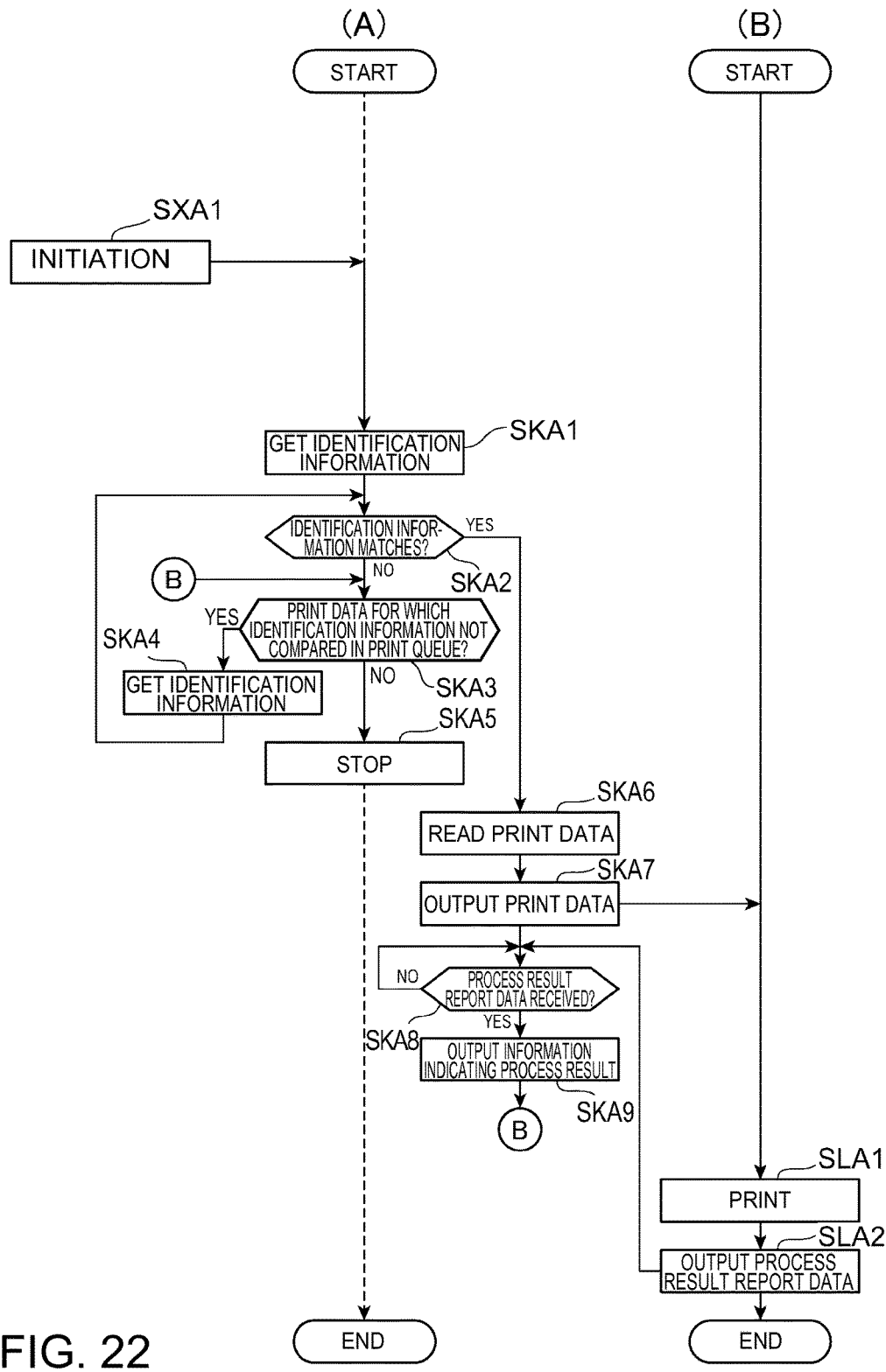
FIG. 22 is a flow chart describing the operation of the control printer.

FIG. 22 (A) is a flow chart describing the operation of the printout process unit SS4, and (B) is a flow chart describing the operation of the print control unit 140c.

If the printout process unit SS4 is not initiated when print data containing the identification information of the control printer SP is stored to the print queue Q, the management unit KB initiates the printout process unit SS4 by starting the print output task (step SXA1).

As shown in (A) of FIG. 22, the printout process unit SS4 references the content of the unread print data stored in the print queue Q that was written earliest to the print queue Q, and acquires the printer identification information contained in that print data (step SKA1).

Next, the printout process unit SS4 determines whether the acquired printer identification information and the identification information of the control printer SP (corresponding identification information) match (step SKA2).

If the identification information does not match (step SKA2 returns NO), the printout process unit SS4 determines whether there is any print data in the print queue Q that is unread and has not been processed to acquire and compare the identification information in step SKA2 (step SKA3).

If there is such print data (step SKA3 returns YES), the printout process unit SS4 acquires from the unread print data the identification information in the print data stored next after the last print data from which the identification information was acquired and compared (step SKA4), and then returns to step SKA2.

If there is no such print data (step SKA3 returns NO), the printout process unit SS4 ends processing by stopping the print output task (step SKA5).

If in step SKA2 the acquired printer identification information and the identification information of the control printer SP match (step SKA2 returns YES), the printout process unit SS4 reads the print data from which the printer identification information was acquired from the print queue Q (step SKA6).

Next, the printout process unit SS4 outputs the read print data to the print control unit 140c (step SKA7).

As shown in (B) of FIG. 22, the print control unit 140c converts the print data to control commands in the command language of the control printer print unit 141, and based on these control commands, controls the control printer print unit 141 to execute a process based on the control commands (step SLA1). Because the print data is receipt print data, a receipt is produced by the control printer SP as the result of step SLA1.

Next, the print control unit 140c outputs information indicating the result of processing the print data to the printout process unit SS4 (step SLA2).

As shown in (A) of FIG. 22, the printout process unit SS4 monitors whether or not information indicating that the process result was input after sending the print data (step SKA8).

If information indicating the process result was input (step SKA8 returns YES), the printout process unit SS4 outputs information indicating the process result by means of an interrupt, for example, to the management unit KB (step SKA9). The print data identification information of the print data that was processed is included in the information indicating the process result. How the information indicating the process result is used by the management unit KB is described further below.

Next, the printout process unit SS4 goes to step SKA3.

As described above, operation of the printout process unit SS4 is triggered by storing print data containing the identification information of the control printer SP in the print queue Q. After initiation, the printout process unit SS4 determines, in the order in which the print data is stored in the print queue Q (in other words, the order the print data is received), whether or not the identification information contained in unread print data stored in the print queue Q matches the identification information of the control printer SP. If the identification information matches, the printout process unit SS4 reads and sends the print data with matching identification information to the print control unit 140c. The print control unit 140c then prints based on the print data.

Thus comprised, the printout process unit SS4 can process print data to be processed by the control printer SP in the order the print data is stored to the print queue Q, that is, in the order the print data is received. The printout process unit SS4 also stops when there is no unread print data to be processed by the control printer SP in the print queue Q. More specifically, the printout process unit SS4 stops when there is no need for processing by the printout process unit SS4. As a result, the printout process unit SS4 remaining initiated when there is no need for it can be suppressed, and the CPU and other hardware resources and other resources can be used effectively.

Another process of the management unit KB is described next.

Figure 23:
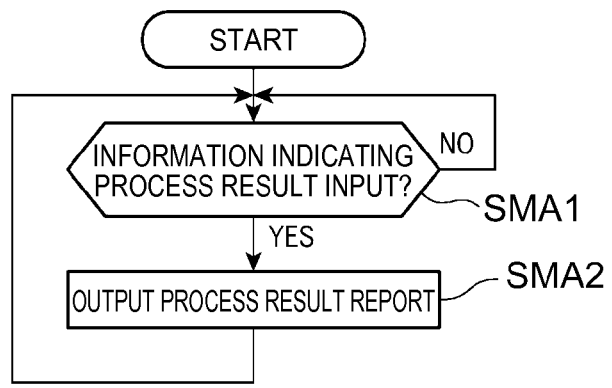
FIG. 23 is a flow chart describing the operation of the control printer.

FIG. 23 is a flow chart describing the operation of the management unit KB.

The management unit KB monitors whether or not information indicating the process result was input (step SMA1). As described above, the print data identification information of the print data that was processed is contained in the information indicating the process result.

When the information indicating the process result is input (step SMA1), the management unit KB generates a process result report containing the print data identification information and reporting that printing based on the print data is completed, and by an interrupt or other means, outputs to the reception process unit JS (step SMA2). Next, the reception process unit JS goes to step SMA1.

As described above, a print data processing system 101 according to this embodiment has a print data distribution server SV (print data distribution device), and a control printer SP (information processing device) having a reception process unit JS that receives print data from the print data distribution server SV.

The reception process unit JS of the control printer SP executes an asynchronous process (first process) that queries the print data distribution server SV for print data at an interval regardless of whether or not printing based on the print data is completed, and receives the print data if there is print data on the print data distribution server SV.

Thus comprised, the control printer SP queries the print data distribution server SV for print data regardless of whether or not printing based on the received print data is completed, and receives the print data if there is any. As a result, the control printer SP can query the server for print data regardless of the status of a process based on the print data, and can shorten the time until the control printer SP receives print data after the print data distribution server SV becomes able to send the print data.

When printing based on the received print data is completed, the reception process unit JS of the control printer SP in this embodiment also sends printing completion report data (a printing completion report) to the print data distribution server SV. When the printing completion report data is received, the print data distribution server SV stores the printing completed value KJ (information indicating that printing was completed) relationally to the corresponding print data. If a print data query is received from the control printer SP, the print data distribution server SV sends print data for which the printing completed value KJ is not stored. When print data is received from the print data distribution server SV, the reception process unit JS of the control printer SP compares the newly received print data with the previously received print data, and if there is a data match, discards the newly received print data.

Thus comprised, because the control printer SP discards the newly received print data when print data is received if the newly received print data and previously received print data do not match, duplicative processes based on the same print data being received more than once can be prevented.

The reception process unit JS of the control printer SP in this embodiment is also characterized by changing the interval between print queries based on how frequently print data is discarded.

Thus comprised, the interval between print data queries can be shortened proportionally to the time required to print the print data, and when print data is frequently discarded, this interval can be appropriately adjusted accordingly.

The reception process unit JS of the control printer SP in this embodiment also stores the received print data in a print queue Q (a specific storage area), and adjusts the interval between print data queries according to the status of the print queue Q.

Thus comprised, the time for querying for print data can be adjusted according to the status of the print queue Q, such as the storage capacity available in the print queue Q, and buffer overflows can be suppressed.

The reception process unit JS of the control printer SP in this embodiment can also execute a synchronous process (second process) that does not query for print data until printing based on the received data is completed after the print data is received, and queries for print data after printing is completed.

Whether the control printer SP executes the asynchronous process or the synchronous process can be set through the configuration interface.

Thus comprised, the asynchronous process or synchronous process can be selected according to the specifications of the print data processing system 101, for example.

A print data processing system 101 according to another embodiment of the invention also has a printer KP that communicates with the control printer SP. The control printer SP has an output unit 140b that sends the received print data to the printer KP. The reception process unit JS of the control printer SP queries the print data distribution server SV for print data with an interval between queries regardless of whether or not the printer KP has finished printing based on the received print data.

Thus comprised, the control printer SP can query the print data distribution server SV for print data regardless of the status of processing by the connected printer KP, and can shorten the time until the control printer SP receives print data after the print data distribution server SV becomes able to send the print data.

The reception process unit JS of the control printer SP in this embodiment queries the print data distribution server SV for print data at an interval regardless of whether or not the control printer print unit 141 has finished printing based on the received print data.

Thus comprised, the control printer SP can query the print data distribution server SV for print data regardless of the status of processing by the control printer print unit 141, and can therefore shorten the time until the control printer SP receives print data after the print data distribution server SV becomes able to send the print data.

The invention is described above with reference to a preferred embodiment thereof, but the invention is not limited thereto and can be modified and adapted in many ways without departing from the scope of the accompanying claims.

For example, when executing the asynchronous process in this embodiment, the reception process unit JS compares the print data identification information of print data already received with the print data identification information of newly received print data to determine if the same print data is received more than once from the print data distribution server SV. The invention is not so limited, however, and the reception process unit JS may, for example, store print data received in the past and compare all or part of the previously received print data with newly received print data, or hash values may be calculated therefor and the hash values compared.

The print data processing system 101 of the invention is described as being applied in a food service business in the foregoing embodiments, but the invention is not so limited and may be used in other industries.

The function blocks shown in FIG. 12, FIG. 13, and FIG. 14 can also be desirably embodied using hardware and software, and do not suggest a specific hardware configuration.

Other Embodiments

Other embodiments of the invention are described below.

In one example, the processes of the management unit KB and the output process unit SS are different.

In the embodiments described above, the output process unit SS reads print data from the print queue Q.

Configurations in which the management unit KB reads the print data are also conceivable.

More specifically, when print data is stored, the management unit KB acquires the identification information contained in the print data, and if the output process unit SS corresponding to the acquired identification information does not exist, initiates the output process unit SS corresponding to the acquired identification information. More specifically, the management unit KB initiates an output process unit SS when the identification information contained in the print data is the identification information of the printer KP, and initiates the printout process unit SS4 when the identification information is the identification information of the control printer SP.

After initiating the output process unit SS, the management unit KB compares, for any unread print data stored in the print queue Q, the identification information contained in the print data with the acquired identification information in the order the print data was stored. If the identification information matches, the management unit KB reads and outputs the print data to the initiated output process unit SS. After outputting the print data, the management unit KB stops outputting print data to the initiated output process unit SS until information indicating the process result is input.

The output process unit SS manages the input print data. More specifically, when the output process unit SS is a transmission process unit S, the output process unit SS sends the print data to the corresponding printer KP. When the output process unit SS is the printout process unit SS4, the output process unit SS sends the print data to the print control unit 40c. The output process unit SS also outputs the information indicating the process result to the management unit KB.

When information indicating the process result is input, the management unit KB compares the identification information with the print data stored next after the last read print data, and reads and outputs the print data if the identification information matches. If the identification information does not match, the management unit KB compares the identification information with the print data stored next, and continues processing based on the result of the comparison.

When there is no print data that is unread and for which the identification information has not been compared in the print queue Q. The management unit KB stops the corresponding task and thereby stops the instantiated output process unit SS.

This embodiment has the same effect as the embodiments described above.

For example, the printer KP outputs to an initiated output process unit SS print data to be processed by that output process unit SS in the order the print data is received. As a result, print data can be processed in the order received by the printer KP, and print data can be processed by the control printer SP in the order received.

In the embodiments described above, the management unit KB reads print data stored in the print queue Q in the order received, and outputs the read print data to the output process unit SS corresponding to the identification information contained in the read print data. The output process unit SS outputs print data input from the management unit KB to the printer KP of the corresponding identification information.

Thus comprised, the output process unit SS sends print data in the order received to the corresponding printer KP, and when sending print data received from the print data distribution server SV to the printer KP, the control printer SP can send the print data in the order received from the print data distribution server SV.

In another embodiment, after outputting print data to the output process unit SS corresponding to particular identification information, the management unit KB does not output the next print data to the output process unit SS corresponding to the same identification information until the printer KP finishes processing the print data output thereto.

Thus comprised, the management unit KB can send the next print data to the output process unit SS after printing based on the last print data is completed.

In another embodiment, the management unit KB initiates a new output process unit SS when the output process unit SS corresponding to the identification information contained in the print data does not exist, and does instantiate the output process unit SS when it already exists.

Thus comprised, initiating plural output process units SS for a single printer KP can be prevented.

In another embodiment, when an output process unit SS has been initiated for particular identification information and the print queue Q is then cleared of unread print data with the same identification information, the management unit KB stops the output process unit SS corresponding to that identification information.

Thus comprised, when a particular output process unit SS is no longer needed for processing, keeping the output process unit SS initiated unnecessarily can be suppressed.

In another embodiment, the management unit KB initiates the printout process unit SS4 when print data containing the identification information of the control printer SP is stored to the print queue Q by the reception unit 40a, and when print data containing the identification information of the control printer SP is read from the print queue Q, outputs the read print data to the printout process unit SS4. The printout process unit SS4 outputs the input print data to the print control unit 40c.

Thus comprised, the control printer SP can process and printer in the order received print data that should be processed by the control printer SP.

The invention being thus described, it will be apparent that it may be varied in many ways. Such variations are not to be regarded as a departure from the spirit and scope of the invention, and all such modifications as would be apparent to one skilled in the art are intended to be included within the scope of the following claims.

What is claimed is:

1. A print data processing system comprising:
a plurality of print data distribution devices; and
an information processing device that receives print data from the plurality of print data distribution devices;
wherein the information processing device initiates a reception processor corresponding to one print data distribution device among the plurality of print data distribution devices; and
each reception processor queries the print data to the corresponding print data distribution device, receives the print data when the print data is on the corresponding print data distribution device, and stores the received print data to a shared storage area,
wherein a first reception processor and a second reception processor are able to simultaneously receive the print data from the corresponding print data distribution device,
wherein the first reception processor sends a first report to prohibit the second reception processor from storing the print data to the shared storage area when the print data is beginning to be stored by the first reception processor to the shared storage area, and
wherein the first reception processor sends a second report to notify the second reception processor that storing the print data to the shared storage area is no longer prohibited when the first reception processor completes storing the print data to the shared storage area, the second reception processor being permitted to store the print data to the shared storage area.

2. The print data processing system described in claim 1, wherein: the reception processor of the information processing device queries for the print data at a specific time interval; and can set the specific time individually for each reception processor.

3. The print data processing system described in claim 1, wherein: the information processing device is connected to an external device; and distributes the print data that is stored in the shared storage area and contains an identification information of the external device to the external device.

4. The print data processing system described in claim 1, wherein:

the information processing device has a print mechanism that prints based on the print data, the prints by the print mechanism based on the print data that are stored in the shared storage area contain the identification information of the information processing device.

5. The print data processing system described in claim 1, further comprising:
   a printing device connected to the information processing device;
   wherein the information processing device including a manager that, based on identification information contained in the print data stored in the shared storage area, initiates an output processor corresponding to the identification information; and
   the output processor reads the print data stored in the shared storage area in an order received, and outputs the print data including the identification information related to the output processor to the printing device.

6. The print data processing system described in claim 5, wherein:
   the manager of the information processing device initiates a new output processor when the output processor corresponding to the identification information contained in the print data does not exist, and when the output processor exists, not initiating the new output processor.

7. The print data processing system described in claim 5, wherein:
   the output processor of the information processing device stops when there is no print data in the shared storage area that contains the identification information of the output processor and is unread.

8. The print data processing system described in claim 5, wherein;
   identification information of the printing device or identification information of the information processing device is included in the print data;
   the information processing device includes a print mechanism and a print controller that controls the print mechanism based on the print data;
   the manager of the information processing device initiates the output processor corresponding to the identification information of the information processing device when the print data containing the identification information of the information processing device is stored by the reception processor in the storage area; and
   the output processor corresponding to the identification information of the information processing device reads the print data stored in the storage area in the order received, and outputs the print data including the identification information of the information processing device to the print controller.

9. The print data processing system described in claim 1, further comprising:
   a printing device connected to the information processing device; the information processing device including a manager that, based on identification information contained in the print data stored in the shared storage area, initiates an output processor corresponding to the identification information; wherein
   the manager reads the print data shared stored in the storage area in an order received, and outputs the read print data to the output processor related to the identification information contained in the read print data; and
   the output processor outputs the print data input from the manager to the printing device of the corresponding identification information.

10. The print data processing system described in claim 9, wherein:
    the manager of the information processing device does not output next print data to the output processor related to the identification information during a period from outputting the print data to the output processor related to particular identification information until a process of the printing device based on the output print data is completed.

11. The print data processing system described in claim 1, wherein: the reception processor of the information processing device executes a first process of querying the print data distribution device for the print data at a specific interval regardless of whether or not printing based on the received print data is completed; and if the response to the query indicates there is the print data, requesting transmission of the print data from the print data distribution device and receiving the print data.

12. A method of operating an information processing device comprising:
    initiating a reception process with a first reception processor corresponding to one external server among a plurality of external servers,
    querying a print data to the corresponding external server,
    receiving the print data when the print data is on the corresponding external server, and
    storing the received print data to a shared storage area,
    wherein the received print data stored in the shared storage area is accessed according to identification information in the received print data,
    wherein the first reception processor and a second reception processor are able to simultaneously receive the print data from the corresponding print data distribution device,
    wherein the first reception processor sends a first report to prohibit the second reception processor from storing the print data to the shared storage area when the print data is beginning to be stored by the first reception processor to the shared storage area, and
    wherein the first reception processor sends a second report to notify the second reception processor that storing the print data to the shared storage area is no longer prohibited when the first reception processor completes storing the print data to the shared storage area, the second reception processor being permitted to store the print data to the shared storage area.

13. The method of operating an information processing device of claim 12, wherein:
    the information processing device has a manager that initiates an output processor corresponding to identification information based on the identification information of an external device included in the print data stored in the shared storage area; and
    the output processor reads the print data stored in the shared storage area in the order received, and
    outputs the print data including the identification information of the output processor to the external device.

14. The method of operating an information processing device of claim 12, wherein;
    the information processing device includes a manager that, based on identification information of an external device contained in the print data stored in the shared storage area, initiates an output processor corresponding to the identification information;

the manager reads the print data stored in the storage area in received order, and outputs the print data to the output processor related to the identification information contained in the read print data; and the output processor outputs the print data input from the manager to the external device of corresponding identification information.

15. The method of operating an information processing device of claim 12, wherein: the information processing device queries the external device for the print data at a specific interval regardless of whether or not printing based on the print data received from the external device is completed, and if a response to the query indicates there is the print data, requesting transmission of the print data from the external device and receiving the print data.

16. An information processing device comprising:
a print mechanism that prints based on print data;
wherein the information processing device is configured to initiate a reception process with a reception processor corresponding to one external server among a to plurality of external servers, query the print data to the corresponding external server, receive the print data when the print data is on the corresponding external server, and store the received print data to a shared storage area,
wherein a first reception processor and a second reception processor are able to simultaneously receive the print data from the corresponding print data distribution device,
wherein the first reception processor sends a first report to prohibit the second reception processor from storing the print data to the shared storage area when the print data is beginning to be stored by the first reception processor to the shared storage area, and
wherein the first reception processor sends a second report to notify the second reception processor that storing the print data to the shared storage area is no longer prohibited when the first reception processor completes storing the print data to the shared storage area, the second reception processor being permitted to store the print data to the shared storage area.

17. The information processing device described in claim 16, further comprising:
a print controller that controls the print mechanism based on the print data; and
a manager that initiates an output processor related to identification information of an external device or the identification information of the printing device included in the print data stored in the shared storage area;
wherein the output processor related to the identification information of the external device reads the print data stored in the shared storage area in an order received, and
outputs the print data including the identification information related to the output processor related to the identification information of the external device to the external device; and
the output processor related to the identification information of the printing device reads the print data stored in the storage area in the order received, and outputs the print data including the identification information related to the output processor related to the identification information of the printing device to the print controller.

18. The information processing device described in claim 16, further comprising:
a print controller that controls the print mechanism based on the print data; and
a manager that initiates an output processor related to identification information based on the identification information of an external device or identification information of the printing device included in the print data stored in the shared storage area;
the manager reading the print data stored in the shared storage area in an order received, and outputting the print data to the output processor related to the identification information contained in the read print data;
wherein the output processor related to the identification information of the external device outputs the print data input from the manager to the external device of the related identification information; and
the output processor related to the identification information of the printing device outputs the print data input from the manager to the print controller.

19. The information processing device described in claim 16, wherein: the printing device has a reception processor that queries the external device for the print data at a specific interval regardless of whether or not printing by the print mechanism based on the print data received from the external device is completed, and if the response to the query indicates there is the print data, requests transmission of the print data from the external device and receives the print data.

* * * * *